(12) United States Patent
Hakeem et al.

(10) Patent No.: US 11,707,784 B2
(45) Date of Patent: Jul. 25, 2023

(54) SPARK PLASMA SINTERED CBN AND NI-CBN BEARING STEEL

(71) Applicant: KING FAHD UNIVERSITY OF PETROLEUM AND MINERALS, Dhahran (SA)

(72) Inventors: Abbas Saeed Hakeem, Dhahran (SA); Akeem Yusuf Adesina, Dhahran (SA); Muhammad Umar Azam, Dhahran (SA); Bilal Anjum Ahmed, Dhahran (SA); Ahmad A. Sorour, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/653,566

(22) Filed: Oct. 15, 2019

(65) Prior Publication Data
US 2022/0152700 A1    May 19, 2022

(51) Int. Cl.
*B22F 3/105*    (2006.01)
*C22C 38/18*    (2006.01)
(Continued)

(52) U.S. Cl.
CPC .......... *B22F 3/105* (2013.01); *C22C 32/0068* (2013.01); *C22C 38/002* (2013.01); *C22C 38/02* (2013.01); *C22C 38/04* (2013.01); *C22C 38/18* (2013.01); *C22C 38/32* (2013.01); *F16C 33/30* (2013.01); *B22F 2003/1051* (2013.01); *B22F 2301/35* (2013.01); *B22F 2302/20* (2013.01);
(Continued)

(58) Field of Classification Search
CPC .............................................. B22F 2003/1051
See application file for complete search history.

(56) References Cited

U.S. PATENT DOCUMENTS

| | | | |
|---|---|---|---|
| 5,545,249 | A | 8/1996 | Tanaka et al. |
| 6,103,185 | A | 8/2000 | Baazi et al. |

(Continued)

FOREIGN PATENT DOCUMENTS

| | | | |
|---|---|---|---|
| CN | 106756599 A | | 5/2017 |
| CN | 109266950 A | * | 1/2019 |

(Continued)

OTHER PUBLICATIONS

Espacenet machine translation of JPH0344450A retrieved on Apr. 1, 2022 (Year: 1991).*

(Continued)

*Primary Examiner* — Jophy S. Koshy
*Assistant Examiner* — Joshua S Carpenter
(74) *Attorney, Agent, or Firm* — Oblon, McClelland, Maier & Neustadt, L.L.P.

(57) ABSTRACT

Bearing steel comprising cubic boron nitride (c-BN) and/or nickel coated cBN spark plasma sintered at a temperature in the range of 850-1050° C. is disclosed. The tribological and corrosion resistance of the bearing steel improved with increasing the amount of c-BN. Further improvement in the properties was achieved with the incorporation of nickel coated c-BN, which caused a phase transition of the bearing steel from magnetic to non-magnetic phase accompanied by interdiffusion enhancement between the matrix and c-BN reinforcement.

9 Claims, 30 Drawing Sheets

(51) Int. Cl.
F16C 33/30 (2006.01)
C22C 38/32 (2006.01)
C22C 32/00 (2006.01)
C22C 38/04 (2006.01)
C22C 38/02 (2006.01)
C22C 38/00 (2006.01)

(52) U.S. Cl.
CPC ..... B22F 2302/205 (2013.01); F16C 2204/60 (2013.01)

(56) References Cited

U.S. PATENT DOCUMENTS

| | | | |
|---|---|---|---|
| 6,572,671 B1 | 6/2003 | Baazi et al. | |
| 2018/0155250 A1* | 6/2018 | Hakeem | C04B 35/597 |
| 2020/0269314 A1* | 8/2020 | Hong | B22F 1/105 |

FOREIGN PATENT DOCUMENTS

| | | | | |
|---|---|---|---|---|
| CN | 109266950 A | | 1/2019 | |
| JP | 3-44450 | | 2/1991 | |
| JP | H0344450 A | * | 2/1991 | ............ C22C 1/05 |

OTHER PUBLICATIONS

Ohtake et al. Fabrication of Composite Material by Using Spark Plasma Sintering. Shizuoka-ken Hamamatsu Kogyo Gijutsu Senta Kenkyu Hokoku, vol. 5, p. 67-72, (1995). (Year: 1995).*

USPTO translation of Ohtake et al. Fabrication of Composite Material by Using Spark Plasma Sintering. (Year: 1995).*

Colpaert, Hubertus. (2018). Metallography of Steels—Interpretation of Structure and the Effects of Processing—15.1.2 AISI 52100 Steel. ASM International. (Year: 2018).*

Espacenet machine translation of CN-109266950-A retrieved on Apr. 2, 2022 (Year: 2019).*

Guillon, Olivier, et al. "Field-assisted sintering technology/spark plasma sintering: mechanisms, materials, and technology developments." Advanced Engineering Materials 16.7 (2014): 830-849. (Year: 2014).*

Irshad, Hafiz Muzammil, et al. "Investigation of the structural and mechanical properties of micro-/nano-sized Al2O3 and cBN composites prepared by spark plasma sintering." ceramics international 43.14 (2017): 10645-10653. (Year: 2017).*

Shuo Yin, et al., Cold-Sprayed Metal Coatings with Nanostructure, Advances in Materials Science and Engineering, vol. 2018, Article ID 2804576, 19 pages, https://doi.org/10.1155/2018/2804576, 1 page.

Ahmed El-Tantawy, et al., Microstructure and properties of BN/Ni—Cu composites fabricated by powder technology, Journal of Experimental Nanoscience, vol. 13, 2018—Issue 1, https://doi.org/10.1080/17458080.2018.1467049, 22 pages.

Qing Miao, et al., Brazing of CBN grains with Ag—Cu—Ti/TiX composite filler—The effect of TiX particles on microstructure and strength of bonding layer, Materials & Design vol. 98, May 15, 2016, pp. 243-253, https://doi.org/10.1016/j.matdes.2016.03.033, 2 pages.

* cited by examiner

SPARK PLASMA SINTERED CBN AND NI-CBN BEARING STEEL

BACKGROUND OF THE INVENTION

Field of the Invention

The present invention relates to a wear and corrosion resistant bearing steel comprising cubic-boron nitride (c-BN) or nickel coated c-BN prepared by spark plasma sintering (SPS).

Description of the Related Art

The "background" description provided herein is for the purpose of generally presenting the context of the disclosure. All references cited herein are incorporated by reference. Work of the presently named inventors, to the extent it is described in this background section, as well as aspects of the description which may not otherwise qualify as prior art at the time of filing, are neither expressly or impliedly admitted as prior art against the present disclosure.

Bearing steel is widely used in many applications including ball bearings, cutting tools, working tools, spouts, nozzles, and other applications where high wear, fatigue resistance, and high thermal shock resistance are required. Bearing steel is subject to ever increasing demands to meet evolving challenges including enhanced mechanical properties and increased productivity, as well as developing production methods of obtaining bearing steel at a lower cost with lower environmental impact. Thus, several methodologies have been developed to produce bulk bearing steel to meet industrial needs. Currently used methods such as electric furnace melting, casting, and forging or rolling require post production heat treatment. Heat treatment has been the method of choice for strengthening and increasing the toughness of bearing steel. It has been used successfully in producing spheroidized microstructures of chromium carbide distributed in a ferritic matrix, quenched microstructures (martensitic matrix), annealed microstructures (pearlite and cementite matrix) and combined microstructures such as martensitic, retained austenitic, and spheroidized matrix [Stickels, C A. "Carbide Refining Heat Treatments for 52100 Bearing Steel" Met Trans (1974) 5:865-74; doi: 10.1007/BF02643140; and Graeve et al. "Spark plasma sintering of Fe-based structural amorphous metals (SAM) with $Y_2O_3$ nanoparticle additions" Mater Lett. (2008) 62:2988-91; doi:10.1016/j.matlet.2008.01.092]. However, heat treatment consumes a large amount of energy leading to increasing cost of production and the emission of carbon dioxide, a greenhouse gas.

Powder metallurgy methods offer several advantages over other manufacturing processes for the production of high temperature hardened materials such as metal matrix composites. The methods are relatively easy and produce sintered steel with enhanced properties [Makena et al. "Influence of Temperature on Microstructure and Mechanical Properties of Ni-40Fe-10Co Alloy Consolidated by Spark Plasma Sintering" Procedia Manuf (2017) 7:708-13; doi: 10.1016/j.promfg.2016.12.105]. The powder method includes preparing a powder by a milling followed by consolidation.

Spark plasma sintering (SPS) is an energy and time-saving method for consolidating powder and simultaneously utilizes pressure and temperature during consolidation. The combination of pressure and temperature achieves full and high densification which makes the process one of the most effective densification and consolidation processes. The method is particularly suitable for preparing composite material from nanomaterials. Many novel materials with superior properties which were unattainable with conventional processes have been successfully produced by the SPS method [Shen et al. "Spark Plasma Sintering of Alumina" J TheAmerican Ceram Soc (2002) 85:1921-7; Irshad et al. "Effect of Ni content and $Al_2O_3$ particle size on the thermal and mechanical properties of $Al_2O_3$/Ni composites prepared by spark plasma sintering" Int J Refract Met Hard Mater (2018) 76:25-32, doi:10.1016/j.ijrmhm.2018.05.010; Saheb et al. "Spark plasma sintering of metals and metal matrix nanocomposites: A review" J Nanomater (2012); doi: 10.1155/2012/983470; and Dong et al. "Understanding the spark plasma sintering from the view of materials joining" Scr Mater (2016) 123:118-121; doi:10.1016/j.scriptamat.2016.06.014].

Recently, 52100-chrome steel with improved mechanical, corrosion and tribological properties has been reported [Fernandes et al. "Wear and corrosion of niobium carbide coated AISI 52100 bearing steel" Surf Coatings Technol (2015) 279:112-7, doi:10.1016/j.surfcoat.2015.08.036; Wang et al. "Influence of isothermal hardening on the sliding wear behavior of 52100 bearing steel" Tribol Int (1990) 23:47-53, doi:10.1016/0301-679X(90)90072-W; Seyda et al. "Wear Behavior of Heat Treated" 100Cr6 Steels.pdf. Mater Test (2013) 55:290-3; and Tiiredi et al. "Tribological response of heat treated AISI 52100 steels against steel and ceramic counterparts" Arch Foundry Eng 2017; 17:222-8; doi: 10.1515/afe-2017-0119]. Several modification including coatings and heating have been explored to improve its steel properties. Kuffner et al. ["Study of the AISI 52100 Steel Reuse Through the Powder Metallurgy Route Using High Energy Ball Milling" Mater Res (2017); doi:http://dx-.doi.org/10.1590/1980-5373-MR-2017-0546] investigated the properties of 52100 steel reinforced with 1, 3 and 5 wt. % alumina through powder metallurgy. The process parameters included uniaxial pressure of 175 MPa, temperature of 1200° C. and sintering for 30 minutes. The results indicate that the microstructural and mechanical properties of AISI 52100 steel improved with the addition of alumina.

Ceramic materials are known for their improved mechanical properties and thus, are often used in cutting tool steels. Also, incorporation of ceramics into other matrices has been a means of strengthening other materials due to good adhesion between the ceramic and the matrix.

Being the second known hardest material after diamond, cubic boron nitride (cBN) can be used to reinforcemetal matrix composites [Wentorf et al. "Sintered Superhard Materials" Science (1980) 208: 873-80, doi:10.1126/science.208.4446.873]. Recently, studies have shown that reinforcement with cBN improves tribological and mechanical properties of both metal and ceramic base matrixes [Hussain et al. "Development of cBN reinforced Ti6A14V MMCs through laser sintering and process optimization" Mater Manuf. Process (2017) 32:1667-77; doi:10.1080/ 10426914.2017.1303152; Hussain et al. "Experimental study of microstructure, mechanical and tribological properties of cBN particulates SS316 alloy based MMCs fabricated by DMLS technique" J Mech Sci Technol (2017) 31:2729-37; doi:10.1007/s12206-017-0516-3; Ciftci et al. "CBN cutting tool wear during machining of particulate reinforced MMCs" Wear (2004) 257:1041-6, doi:10.1016/ J.WEAR.2004.07.005; Yaman et al. "Effect of cubic boron nitride addition on the properties of aluminum composite foams" Adv Mater Process Technol (2017) 3:83-9; doi: 10.1080/2374068X.2016.1247340; Loginov et al. "Diamond and cBN hybrid and nanomodified cutting tools with enhanced performance: Development, testing and modelling" Mater Des (2015) 88:310-9; doi:10.1016/J.MATDES.2015.08.126; Njuguna et al. "Experimental Study on Performance of CBN-Coated, CBN-Uncoated and PCD Tools in Turning Al 2124 SiC (45% wt) PMMC" Key Eng Mater (2013) 567:27-31; doi:10.4028/www.scientific.net/KEM.567.27; and Kemaloglu et al. "Properties of thermally conductive micro and nano size boron nitride reinforced silicon rubber composite". Thermochim Acta (2010) 499: 40-7; doi:10.1016/J.TCA.2009.10.020].

US657267US and U.S. Pat. No. 6,103,185A disclose methods for preparing steels comprising hexagonal boron nitride (h-BN). One method comprises mixing 0.1-2.0 wt. % h-BN powder with a steel powder, compacting the powder at a pressure in the range of 276-828 MPa, then compressing and sintering at a temperature in the range of 1093-1371° C. for a time in the range of 15-60 minutes. A second method comprises compressing a steel powder to form a green body, impregnateing the green body with a solution containing h-BN, and sintering at a temperature in the range of 1093-1371° C. Another disclosed method comprises compacting steel powder at a pressure in the range of 276-828 MPa, sintering at a temperature in the range of 1093-1371° C. for a time in the range of 15-60 minutes, and impregnating the sintered steel with a solution containing h-BN.

JP3044450A discloses a method of making a bearing steel composite comprising 5-30% c-BN, and 5-20% Ni or Co. The method comprises mixing steel powder, c-BN, and Ni or Co powder, compressing the powder, and sintering the compressed powder at a temperature in the range 900-1350° C. While the JP3044450A patent discloses that the sintered steal is harder than the steel used to make the composite, it does not disclose the method of sintering the steel composite or the properties of the c-BN containing steel.

CN1067556599A discloses a method of preparing a steel composite comprising 1-30% c-BN. The method comprises ball milling c-BN powder with a steel powder containing 3-15% cobalt, 32-75% iron, 20-50% of one or more metal carbide from groups 4, 5 and 6 of the periodic table, and 0-2% carbon by weight of the total weight of the steel. The disclosed group 5 and 6 metals carbide include those of W, Mo, Cr, and V The resulting mixture is pressed and sintered at a temperature in the range of 1130-1170° C. for 0.5-1.5 h.

CN109266950A discloses a method of preparing a reinforced steel based composite material comprising iron, iron-nickel alloy, and c-BN. The method comprises ball milling a mixture of 10-30 v/v % c-BN, 70-90 v/v % and carbon in the amount of 0.3-2 wt. %. Then, the powder mixture is sintered in an argon atmosphere at a temperature in the range of 1400-1600° C. for 50-70 minutes. Also, the CN109266950A patent discloses the preparation of nickel-plated c-BN comprising activating c-BN powder by acid treatment and reducing by hydrazine solution, and plating the c-BN with nickel.

U.S. Pat. No. 5,545,249A discloses a sintered bearing alloy for high-temperature application comprising 5-10 wt. % h-BN particles having a size in the range of 100-500 μm. The sintered bearing alloy is prepared by mixing granulated h-BN particles having a size in the range of 100-500 μm, steel powder, and 1 wt. % zinc stearate, and compacting to a green cylindrical composite. The green composite was heated initially to 500° C. followed by sintering at 1150° C. in hydrogen and nitrogen atmosphere.

None of the above references discloses an economically and environmentally friendly method for obtaining c-BN reinforced steel. It is therefore, one of the objectives of the present invention is to provide a spark plasma sintered (SPS) cBN and Ni-coated-cBN reinforced bearing steel composite sintered at a temperature below 1000° C. and having improved wear and corrosion properties.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

One aspect of the invention is directed to a method of making a bearing steel composite comprising cubic boron nitride comprises preparing a suspension of steel powder and cubic boron nitride in a solvent, sonicating the suspension filtering and drying the suspension to produce a dry powder, and sintering the dry powder by the spark plasma sintering method at a temperature in the range of 800-1050° C. and pressure in the range of 30-90 MPa for a time in the range 5-20 minutes.

In a preferred embodiment, the bearing steel composite comprises cubic born nitride in an amount in the range of 0.0 wt. % to 40 wt. % of the total weight of the composite.

In another preferred embodiment, the bearing steel composite comprises cubic born nitride in an amount in the range of 5 wt. % to 30 wt. % of the total weight of the composite.

In another preferred embodiment, the cubic boron nitride is nickel coated cubic born nitride.

In another preferred embodiment, the nickel coated cubic boron nitride contains nickel in an amount in the range of 25-75 wt. % of the total weight of the nickel coated cubic boron nitride.

In another preferred embodiment, the bearing steel composite comprises nickel coated cubic born nitride in an amount in the range of 1 wt. % to 40 wt. % of the total weight of the composite.

In another preferred embodiment, the bearing steel composite comprises nickel cubic boron nitride in an amount in the range of 5 wt. % to 30 wt. % of the total weight of the composite.

In another preferred embodiment, the sintering temperature is in the range of 850-1000° C.

In another preferred embodiment, the sintering pressure is in the range of 45-55 MPa.

In another preferred embodiment, the sintering time is in the range of 8-12 minutes.

In another preferred embodiment, the steel powder is steel bearing 52100.

A more preferred embodiment is directed to a method of making a bearing steel composite comprising cubic boron nitride or nickel coated cubic boron nitride comprises preparing a suspension of steel powder and cubic boron nitride or nickel coated boron nitride in a solvent, sonicating the suspension filtering and drying the suspension to produce a dry powder, and sintering the dry powder by the spark plasma sintering method at a temperature in the range of 850-1050° C. and pressure in the range of 45-55 MPa for a time in the range 8-12 minutes; wherein the steel powder is steel bearing 52100 having particles size in the range of 10-100 μm and the amount of cubic boron nitride or nickel coated boron nitride is in the range of 5 wt. % to 30 wt. % of the total weight of the composite.

A second aspect of the invention is directed to bearing steel sintered at a temperature in the range of 850-1050° C. comprising cubic boron nitride having an average size in the range of 5-100 μm in an amount in the range of 0-30 wt. % of the total weight of the composite.

In a preferred embodiment, the bearing steel is sintered at temperature in the range of 900-1000° C.

In another embodiment, the sintering temperature is about 900° C. at a pressure of about 50 MPa for 10 minutes using the spark plasma sintering method.

In another embodiment, the bearing steel has X-ray diffraction angles 2θ of 44.9±0.3, 65.2±0.3, 82.9±0.3, and 98.9±0.2°.

In another embodiment, the sintering temperature is about 1000° C. at a pressure of about 50 MPa for 10 minutes using the spark plasma sintering method.

In another embodiment, the bearing steel has X-ray diffraction angle of 2θ of 43.57±0.08°.

In another preferred embodiment, the cubic boron nitride is nickel coated cubic boron nitride.

In another preferred embodiment, the nickel coated cubic boron nitride contains nickel in an amount in the range of 25-75 wt. % of the total weight of the nickel coated cubic boron nitride.

In another preferred embodiment, the composite is non-magnetic.

In another preferred embodiment, the composite is sintered at 900° C. at a pressure of about 50 MPa for 10 minutes using the spark plasma sintering method.

In another preferred embodiment, the composite XRD spectra display a peak at a diffraction angle (2θ) in the range 43.4-43.47°.

In another preferred embodiment, the composite is sintered at 1000° C. at a pressure of about 50 MPa for 10 minutes using the spark plasma sintering method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
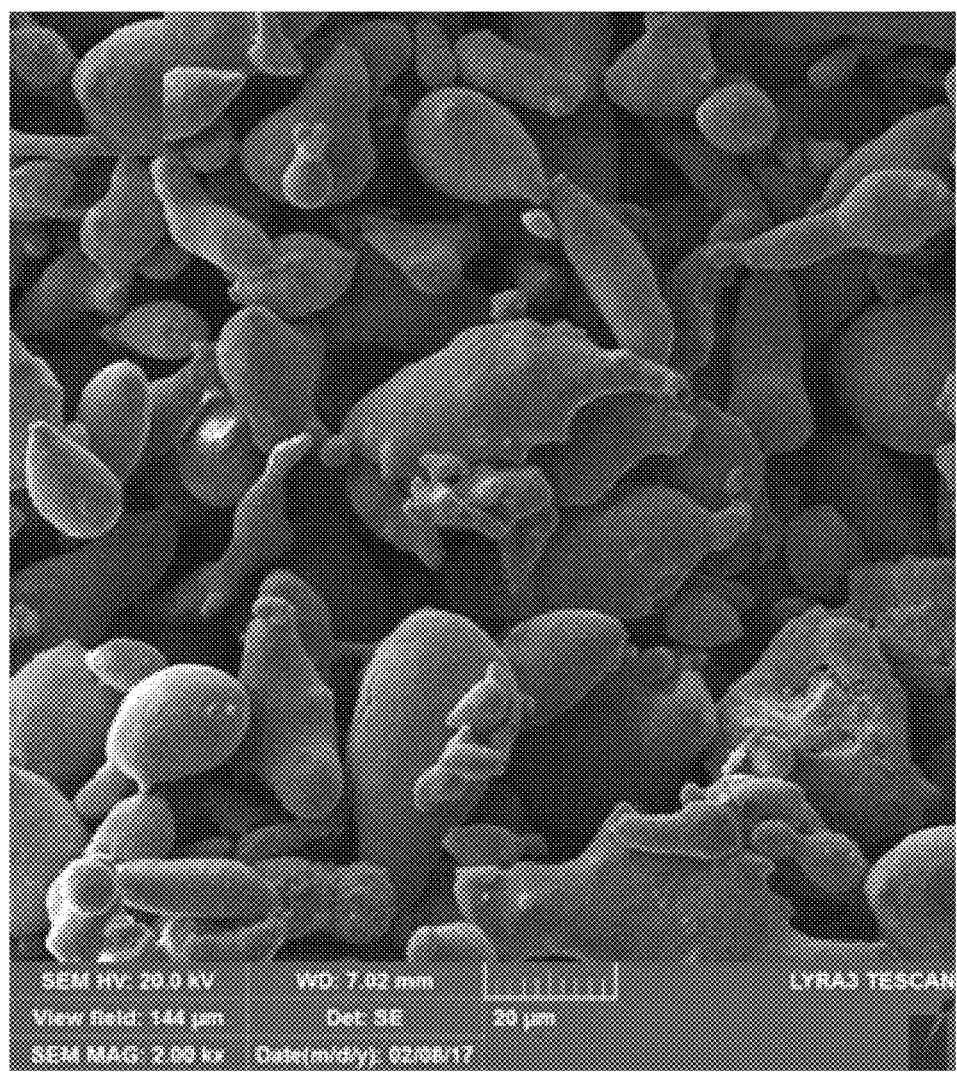
FIG. 1A shows field emission scanning electron microscopy (FESEM) image of the morphology of the 52100-steel powder.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

Unless otherwise specified, "a" or "an" means "one or more".

Terminology used herein is for the purpose of describing particular embodiments only and is not intended to be limiting of the invention.

The headings (such as "Background" and "Summary") and sub-headings used herein are intended only for general organization of topics within the present invention and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items.

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

According to a first aspect, the present disclosure relates to a method for producing a bearing steel using steel powder or steel powder mixed with boron nitride, that includes exposing a mixture to ultrasound and then spark plasma sintering the sonicated mixture. In some embodiments, a solvent suspension containing steel powder and one or more of cubic boron nitride and cubic boron nitride coated with nickel is sonicated to form a sonicated suspension from which the solvent is removed, e.g., by filtering or evaporating the solvent, to obtain a homogenous powder which is dried then sintered by spark plasma sintering at a temperature in the range of 800-1050° C. and pressure in the range of 30-90 MPa for a time in the range 5-30 minutes.

Any bearing steel powder may be utilized in the method of invention including but not limited to 52100, 100Cr6/1.3505, SUJ2, 535A99/EN31, and the like. The chemical composition of the steel may include carbon, chromium, manganese and silicon in addition to minor amounts of metals such as but not limited to nickel, molybdenum, vanadium, tungsten, chromium, and copper. In some embodiments, the bearing steel powder contains an amount of carbon in the range of 0.5-2.0 wt. %, preferably 0.6-1.6 wt. %, 0.7-1.4 wt. %, preferably 0.8-1.3 wt. %, preferably 0.9-1.2 wt. %, preferably 0.95-1.1 wt. %; chromium in the range of 0.5-4.0 wt. %, preferably 0.7-3.3 wt. %, 0.8-3.0 wt. %, preferably 0.9-2.5 wt. %, preferably 1.0-2.0 wt. %, preferably 1.1-1.8 wt. %, preferably 1.2-1.7 wt. %, preferably 1.3-1.6 wt. %; manganese in an amount 0.05-2.0 wt. %, preferably 0.10-1.0 wt. %, 0.15-0.80 wt. %, preferably 0.20-0.60 wt. %, preferably 0.25-0.45 wt. %; and silicon in an amount in the range 0.05-1.0 wt. %, preferably 0.10-0.50 wt. %, 0.15-0.3 wt. % of the total weight of the steel powder. Other metals may be present in an amount in the range 0.01-0.5 wt. % and preferably collectively no more than 2 wt. % of the total weight of the bearing steel powder. Also, sulfur and phosphorus may be present in an amount of less than 0.025 wt. % each. The morphology of the particles of the steel powder may be of any shape including but not limited to regular or irregular spherical, oblong, cubical, rectangular, and the like. The particle size distribution may vary depending on the source and the method of preparing the powder. In some preferred embodiments, 50% of the particles have size less than 100 µm, preferably 80 µm, preferably 60 µm, preferably 40 µm, preferably 30 µm, preferably about 26 µm, and preferably a size greater than 5 µm, preferably 10 µm, 15 µm, or 20 µm. In preferred embodiments, the bearing steel is powdered bearing steel 52100, which has the chemical composition shown in Table 1 (see example 1).

Boron nitride (BN) is a thermally and chemically stable compound. It exists in an amorphous form (a-BN), hexagonal form (h-BN), cubic form (c-BN), and wurtzite form (w-BN). While BN is not as hard as diamond, BN is chemically and thermally more stable and does not dissolve in metals and metal alloys like diamond. Both c-BN and w-BN are considerably harder than a-BN and h-BN and more suitable for use in the method of the present invention. The w-BN form of boron nitride crystalizes in point group C6v of space group P63mc having the same structure as lonsdaleite, a rare hexagonal polymorph of carbon. As in the cubic form, the boron and nitrogen atoms are grouped into tetrahedral crystal. As in the cubic form, the boron and nitrogen atoms are grouped into 6-membered rings, preferably all rings are in the chair configuration, whereas in w-BN the rings between 'layers' are in a boat configuration. Cubic boron nitride has a crystal structure analogous to that of diamond. Consistent with diamond being less stable than graphite, the cubic form is less stable than the hexagonal form, but the conversion rate between the two forms is negligible at room temperature, as it is for diamond. The cubic form has the sphalerite crystal structure, similar to that of diamond.

In some embodiments, c-BN powder is used to prepare the bearing steel of the invention. The cBN powder contains microparticles, which may be spheres, spheroids, ellipsoids, flakes, cubes, prisms, or irregular shapes with curved and/or flat surfaces, unless otherwise specified. In a preferred the cBN microparticles are cubic, rectangular, tetragonal, or cuboid. As used herein, a diameter of a particle, including nanoparticles and micro-particles, refers to the greatest distance measured from one point on the particle through the center of the particle to a point directly across from it. A diameter of a flake, as used herein, refers to the greatest distance measured from a first point on a perimeter of the flake through the center of the flake to a second point, also on the perimeter of the flake, directly across from the first point. The diameters of the particles are described hereinafter. The c-BN particles may have a diameter of 5-200 µm, preferably 10-150 µm, preferably 15-100 µm, preferably 20-80 µm, preferably 30-60 µm, preferably 40-55 µm, preferably 45-50 µm. However, in some embodiments, the cBN microparticles may have a diameter or the largest dimension of less than 10 µm, (for instance, as nanoparticles) or greater than 50 µm. In an alternative embodiment, microparticles of boron nitride may contain w-BN or a mixture of c-BN and w-BN.

The first step of the method of the invention is forming a homogenous mixture of bearing steel powder and powdered BN. Methods known in the art may be utilized to form the mixture in addition to the ultrasound method disclosed herein. Homogeneous is used in the context of this mixture to describe a mixture of powders that are dispersed in one another such that the amount of each component per unit volume is substantially the same through the entire mixture.

In some embodiments, the mixture is prepared by mixing the components by ball milling, or high energy ball milling. The components may be milled with a miller, such as a planetary miller, an attrition mill, a vibratory mill or a high energy miller. Non-limiting examples of milling media (i.e. bowl and balls) include zirconium dioxide, tungsten carbide, silicon nitride, and alumina. In one embodiment, silicon nitride milling media is employed to minimize contamination of the powder mixture. The balls used for milling may have a diameter of 200-1,000 µm, preferably 300-900 µm, preferably 400-800 µm, preferably 600-650 µm, though balls with diameters smaller than 200 µm, or greater than 1,000 µm, may be used. In one embodiment, a weight ratio of the balls to the powder mixture ranges from 4:1 to 35:1, preferably from 5:1 to 30:1, preferably from 10:1 to 25:1. A process control agent, such as stearic acid or ethanol, may be added to the powder mixture to ensure the powder mixture does not cake. Preferably ethanol is used. An amount of the process control agent ranges from more than 0 wt % to 2 wt %, preferably 0.5-1.5 wt %, preferably 0.5-1 wt % of the weight of the powder mixture. In another embodiment, no process control agent is employed. In one embodiment, the milling is performed in an inert atmosphere, preferably provided by inert gas such as argon gas, though in another embodiment, the milling may be performed in air. The powder mixture may be milled for up to 10 hours, or up to 5 hours, or up to 2 hours, preferably for 10-90 minutes, preferably for 45-75 minutes. A high-energy ball milling apparatus may use a rotation rate of 2,000-10,000 rpm, preferably 2,500-5,000 rpm, preferably 2,750-3,250 rpm. Preferably, the ball milling decreases the size of the particles by 30-95%, preferably 40-90%, more preferably 60-90% relative to a size of the particles before the ball milling. In one embodiment, ball milling in air may lead to slight chemical changes of the mixture components.

In another embodiment, the mixture components may be mixed incrementally, for instance, the steel powder may be homogenized first by sonication, and then cBN microparticles may be added and then the mixture may be further sonicated, in order to not substantially decrease the size of the cBN microparticles. In an alternative embodiment, the steel powder and cBN microparticles may be mixed by mortar and pestle, or by other means, such as a blade grinder or burr grinder. Changes in particle sizes before and after the mixing may be measured by field emission scanning electron microscopy (FESEM), dynamic light scattering, or other techniques In yet another embodiment, the mixture of steel powder and c-BN powder is prepared by sonication. In a preferred embodiment, the powders are dispersed in a sufficient amount in an organic solvent, preferably volatile at room temperature, to form a slurry which is sonicated (i.e., treated with ultrasound) for 5-60 minutes, preferably 10-50 minutes, preferably 15-40 minutes, preferably about 30 minutes, preferably about 25 minutes. The sonication may be applied by inserting an ultrasonic probe into the slurry or by placing a container of the slurry into a sonication bath. The sonication array is pulsed or continuous. Non-limiting examples of the organic solvent include hydrocarbon solvents, such as but not limited to pentane, cyclopentane, hexane, cyclohexane, heptane, and the like; alcohols such as, but not limited to ethanol, methanol, propanol, isopropanol, butanol, isobutanol, and the like; ethers such as but not limited to dimethyl ether, diethyl ether, and the like; ketones such as acetone, methylethyl ketone, diethylketone, and the like; and esters such as but not limited to ethyl acetate, and chlorinated hydrocarbons, such as chloromethane, dichloromethane, chloroform, carbon tetrachloride, and the like. Preferably, the solvent is an alcohol. More preferably, the alcohol is a liquid at 0° C. and has a boiling point of less than 100° C. In a preferred embodiment, the solvent is an alcohol such as ethanol. The organic solvent may act as a viscosity modifying agent, providing a suitable viscosity for handling the slurry and accomplishing the mixing. In addition, the solvent may have a viscosity in range from 0.5-2 cP preferably 0.5-1.5 cP, preferably 0.5-1.2 cP. Any amount of liquid that accomplishes the mixing is acceptable. Preferably, the solids content is between 15-50 vol %, preferably 15-35 vol %, more preferably 20-30 vol % of the total volume of the slurry. Below this limit, mixing may be ineffective or separation by settling may occur, although a solid content below this limit may still be used depending on the particle size, solvent, and mixing procedure. Above the limit, in some instances, the viscosity may be too high and mixing and de-agglomeration may not be effective. The volatile organic solvent may evaporate during sonication, leaving powder mixture. Preferably, after sonication, the slurry is heated to a temperature in the range of 60-120° C., preferably 70-90° C., preferably about 80° C. for 1-24 hours, preferably 8-24 hours, more preferably 10-24 hours to remove the solvent completely. In one embodiment, the sonication may break up particles and decrease particle sizes by 10-90%, preferably 20-70%, relative to a particle size before the sonicating. However, in some embodiments, the particle size distribution may not change substantially before and after the sonicating. Methods well-known in the art may be used to separate the sonicated solid powder components from the solvent, such as but not limited to filtration, evaporation and centrifugation.

The amount of c-BN micro-particles in the mixture may vary depending on the end use of the bearing steel. In some embodiments, the mixture contains c-BN in an amount in the range of 0.5-40 wt. %, preferably 5-35 wt %, preferably 10-30 wt. % by weight of the total weight of the mixture. However, in some embodiments, the cBN microparticles may be present in the mixture at a weight percentage lower than 0.5 wt % or greater than 40 wt % relative to a total weight of the mixture. In one embodiment, the mixture comprises c-BN coated with nickel, i.e., the nickel is located on parts of an exterior surface of the cBN microparticles or entirely covering individual cBN microparticles. The nickel may be in the form of nanoparticles having diameters of 20-500 nm, preferably 50-300 nm, more preferably 80-150 nm. The nickel coated cBN microparticles contain nickel in an amount in the range of 20-80 wt. %, preferably 25-75 wt. %, preferably 30-70 wt. %, preferably 35-65 wt. %, preferably about 60 wt. % of the total weight of the nickel coated c-BN. However, in some embodiments, where the nickel is located on an exterior surface of the cBN microparticles or entirely covers individual cBN microparticles, the cBN microparticles may comprise less than 20 wt % or greater than 80 wt % nickel. In alternative embodiments, the cBN microparticles may be coated or in contact with other transition metals such as, but not limited to Ti, V, Mn, Nb, Cr, Cu, W, Zr, Mo, Fe, and the like.

The mixed powder may be sintered by several methods such as but not limited to hot pressing, hot isostatic pressure, pressureless sintering, or spark plasma sintering. In some embodiments, the sintering is a spark plasma sintering method, which may be preferred over other sintering. The main characteristic of SPS is that the pulsed or unpulsed DC or AC current directly passes through a graphite die, as well as the powder compact, in case of conductive samples. Joule heating plays a dominant role in the densification of powder compacts, which results in achieving near theoretical density at lower sintering temperature compared to other sintering techniques. The heat generation is internal, in contrast to the hot pressing, where the heat is provided by external heating elements. This facilitates a very high heating or cooling rate, and hence, the sintering process generally is very fast. The general speed of the process provides the opportunity of densifying nano-sized and/or nanostructured powders and avoiding coarsening which accompanies standard densification routes. Additional heating elements may be deployed outside the pressing tool to minimize the thermal gradients, and thus, allowing enhancement of the heating rate and optimizing heat homogeneity.

Spark plasma sintering densifies the compacted powders more quickly and at relatively low temperatures. Thus, the formation of secondary phases with different properties may be controlled. For instance, changes in the sintering conditions such as pressure, time, temperature, heating rate, cooling rate, starting particle size may affect the structure of the resulting composite and its properties. For the sintering process, the steel mixture may be transferred to a die with a diameter of 10-50 mm, preferably 15-35 mm, preferably 15-25 mm, or even larger. The die may be lined with a thin graphite sheet to avoid direct contact between the powder and the die, to facilitate the removal of the sintered composite from the die. The exact thickness of the graphite sheet is not critical as long as it does not affect the shape of the final composite and it may be in the range of 100-500 μm, preferably 200-400 μm, preferably about 350 μm. The powder mixture may be compacted into the die at ambient temperature, or while heating or sintering. The compacted powder mixture may be in the form of a disc having a similar diameter as the graphite die, and a thickness of 1-40 mm, preferably 2-15 mm, more preferably 3-10 mm. However, in other embodiments, the compacted powder mixture may be in other forms, such as rectangular prism, depending on the shape of the die. In a preferred embodiment, a uniaxial pressure is applied to the die in a direction that is normal to the ground. In one embodiment, the sintering comprises applying a uniaxial pressure to the powder mixture, where the uniaxial pressure may be in the range of 20-100 MPa, preferably 30-80 MPa, preferably 40-70 MPa, preferably 45-55 MPa, preferably about 50 MPa.

In some embodiments, the sintering step comprises heating the mixture at a rate ranging from 50-600° C./min, preferably 120-500° C./min, preferably 200-400, preferably about 400° C./min. The heating may comprise one or more heating steps. In a preferred embodiment, the heating consists of only one heating step. The sintering temperature of the steel mixture is in the range of 800-1250° C., preferably 850-1050° C., preferably 900-1000° C. In a spark plasma sintering process, the preferred sintering temperature is in the range of 800-1050° C., preferably 850-1000° C., preferably 900° C. Once the composite reaches the desired temperature, the temperature is maintained constant for a time in the range 1-30 minutes, preferably 5-20 minutes, preferably about 8-12 minutes, and preferably about 10 minutes prior to cooling down the composite to ambient temperature. The cooling of the composite may be controlled and/or accelerated with a pre-set program. In some embodiments, the composite is cooled down at a rate in the range of 20-400° C./min, preferably 50-350° C./min, preferably 100-300, preferably about 200° C./min. The composite may be cooled by a flow of an inert gas, such as, but not limited to nitrogen or argon. In some other embodiments, the composite may be cooled down to ambient temperature within 15 minutes, preferably within 12 minutes, preferably within 10 minutes or even less. The composite may be cleaned to remove graphite or other contaminants front the die or sintering apparatus, and the composite may be cut or polished.

A second aspect of the invention is directed to a bearing steel formed by sintering a mixture of steel powder and boron nitride at a temperature in the range of 850-1050° C. The thus formed bearing steel comprises cubic boron nitride inclusions or particles having an average size in the range of 5-100 µm in an amount in the range of 0.1-40 wt. % of the total weight of the bearing steel. In a preferred embodiment, the bearing steel is sintered by spark plasma sintering which allows sintering at lower temperatures than any other method. Unexpectedly, the bearing steel prepared by the method of the invention, e.g., sintered at a temperature of about 900° C., displayed an altered XRD diffraction pattern in comparison to that prepared by other methods. The altered XRD diffraction pattern shows a 2θ peak shift in the range of 0.2-0.5°, preferably 0.3-0.4°. In some embodiments, the bearing steel has an XRD spectrum that is shifted to lower 2θ angles by at least 0.05, preferably 0.1, preferably 0.15, preferably 0.2, preferably 0.25, preferably 0.3, preferably 0.35° from the XRD spectrum obtained for sintered steel at a temperature between 1050-1200° C. In some embodiments of the invention, the bearing steel with and without cBN displays X-ray diffraction angles pattern comprising 2θ angles of 44.9±0.4°, 65.2±0.4°, 82.9±0.3°, and 98.9±0.3°, preferably 44.9±0.2°, 65.2±0.2°, 82.9±0.2°, and 98.9±0.15°, preferably 44.9±0.1°, 65.2±0.1°, 82.9±0.1°, and 98.9±0.1°.

In some embodiments, the bearing steel of the invention comprises nickel coated c-BN and has an XRD spectrum characterized by peaks at 2θ angles of 43.57±0.09°, preferably 43.57±0.08°, preferably 43.57±0.07°, 43.57±0.05°, 43.57±0.03°, 43.57±0.01°, and the disappearance of the characteristic steel bearing signal at a 2θ angle of about 44.56°. The addition of nickel coated c-BN to the bearing steel causes a phase transformation from magnetic to non-magnetic.

The density of the bearing steel of the invention may vary depending on the chemical composition of the steel used in making the bearing steel, the amount of c-BN, and nickel coated c-BN, the sintering temperature, and/or method of sintering. In some embodiments, the bearing steel of the invention may have a density in the range of 7.8-3.0 g/cm$^3$, preferably 7.70-4.0 g/cm$^3$, preferably 6.95-5.0 g/cm$^3$, preferably 6.9-5.6 g/cm$^3$. However, in some other embodiments, the bearing steel may have a density of less than 4.0 g/cm$^3$, or greater than 7.70 g/cm$^3$.

The grain size of the bearing steel may vary depending on the composition and the sintering temperature. In some embodiments, the grain size of the bearing steel is in the range of 1-60 µm, preferably 5-50 µm, preferably 8-40 µm, preferably 12-30 µm, and preferably 15-27 µm.

In some embodiments, the bearing steel of the invention has Rockwell hardness (HRC) in the range of 60-35, preferably in the range of 55-40, preferably 53-41. However, in some other embodiments, the bearing steel of the invention may have Rockwell hardness of less than 35 or greater than 60.

Similar to other properties, the wear rate of bearing steel of the invention is dependent on the chemical composition of the bearing steel and sintering temperature. In some embodiments, the wear rate is less than $100 \times 10^{-6}$ mg/kNm, preferably less than 90, preferably less than 80, preferably less than 60, preferably less than 50, preferably less than 40, preferably less than $25 \times 10^{-6}$ mg/kNm.

Example 1

Preparing Sintered Bearing Steel:

The composition of purchased 52100 bearing steel powder is shown in Table 1. Cubic boron nitride (cBN) and Ni coated cBN (60 wt. % Ni) powders were purchased from Element Six, ABN800, USA. Table 2 shows the composition by weight of each composite and the composite identification tag. The reinforcement powder was mixed and homogeneously dispersed in the matrix powder using an ultrasonic probe sonicator (Model VC 750, Sonics, USA) in ethanol mixing medium.

TABLE 1

Composition of 52100 bearing steel

| Element | C | Cr | Mn | Si | P | S | Fe |
|---|---|---|---|---|---|---|---|
| Composition | 0.95-1.1 | 1.3-1.6 | 0.25 | 0.15-0.3 | 0.3 | 0.25 | Balance |

TABLE 2

Compositions of the bearing steel 52100/cBN(Ni) composites

| | Sintered at 900° C. | | | | | | |
|---|---|---|---|---|---|---|---|
| Sample ID | 9 | 9-1 | 9-2 | 9-3 | 9-1Ni | 9-2Ni | 9-3Ni |
| Composition[a] | 52100 steel | 10% c-BN | 20% c-BN | 30% c-BN | 10% c-BN-Ni | 20% c-BN-Ni | 30% c-BN-Ni |
| 52100 (g) | 20 | 18 | 16 | 14 | 18 | 16 | 14 |
| c-BN (g) | 0 | 2 | 4 | 8 | 5 | 10 | 15 |

TABLE 2-continued

Compositions of the bearing steel 52100/cBN(Ni) composites

| | Sintered at 1000° C. | | | | | | |
|---|---|---|---|---|---|---|---|
| Sample ID | 10 | 10-1 | 10-2 | 10-3 | 10-1Ni | 10-2Ni | 10-3Ni |
| Composition[a] | 52100 steel | 10% c-BN | 20% c-BN | 30% c-BN | 10% c-BN-Ni | 20% c-BN-Ni | 30% c-BN-Ni |
| 52100 (g) | 20 | 18 | 16 | 14 | 18 | 16 | 14 |
| c-BN (g) | 0 | 2 | 4 | 8 | 5 | 10 | 15 |

[a]composition is in wt. % of the total weight.

The mixtures were dried in a furnace at 80° C. for 24 hr to remove the ethanol. Mortar and pestle were used to further mix and collate the dried residual powders into the sintering graphite die. The consolidation parameters were selected based on a cost effective process of synthesizing advanced materials leading to a new sintering route that required low sintering temperature of 900-1000° C. instead of the commonly used temperature of 1100-1200° C. with notable enhancement in the mechanical, wear and corrosion properties. Consolidation of the mixed powders was carried out via a solid-liquid sintering technique by using an SPS apparatus (FCT system, model HP D5, Germany). A 20 mm inner diameter graphite die was used for all experiments. The powders were sintered using two temperatures of 900 and 1000° C. under a press pressure of 50 MPa and holding time of 10 min. Heating and cooling were at rates of 400 and 200° C./min, respectively. Graphite thin sheet, 350 µm thick, was inserted into the graphite die to avoid direct contact of the powders with the die thereby facilitating the removal of the sintered sample from the die and protecting the punch from wear.

Furthermore, the die was protected with a graphite blanket so as to reduce the heat loss during the consolidation process. Pyrometer placed beside the sample was used to monitor the sintering temperature.

Example 2

Methods:

The sintered samples were removed and grounded using size 60 grit of SiC paper in order to remove the graphite sheet. Automatic grinding machine (AutoMet 300, Buehler) was used thereafter to further grind and polish the samples to obtain a fine surface. Diamond wheels with a grit ranging in sizes from 74-10 µm were used, and a diamond suspension was utilized to polish and obtain a fine surface of about 0.25 µm $R_a$ (arithmetic mean) roughness value. The densities of the sintered samples were measured based on Archimedes' method with deionized water as the immersion medium and using density determination equipment (Mettler Toledo). A Vickers hardness testing machine (Buehler, USA) was used to measure the hardness values of the sintered samples under a 20 N (2 kg) load (P). An average of ten values for the density and hardness measurements are reported. Thermal conductivity was measured using a thermal conductivity analyzer (C-THERM-TCi, Canada). Thermal expansion was investigated by using a Mettler Toledo instrument (TMA/SDTA-LF/1100) to measure the coefficients of expansion (a) of the SPS pure bearing steel and composite samples. The experiments were carried out at a temperature range from ambient temperature to 600° C. with a heating rate of 10° C./min in air. Polished samples were cut into cubes with an approximate dimension of 4×4×4 mm for the thermal expansion measurements. To identify the phases, present in the sintered samples, a Rigaku MiniFlex X-ray diffractometer (Japan) was used with Cu Kα1 radiation (γ=0.15416 nm), a tube current of 10 mA, and an accelerating voltage of 30 kV. A field emission scanning electron microscope (FESEM, Lyra3, Tescan, Czech Republic) with an accelerating voltage of up to 20 kV and equipped with energy dispersive X-ray spectroscopy (EDX) silicon drift detector (X-MaxN, Oxford Instruments, UK) was used to characterize the microstructures of the powders and sintered samples.

Example 3

Figure 1B:
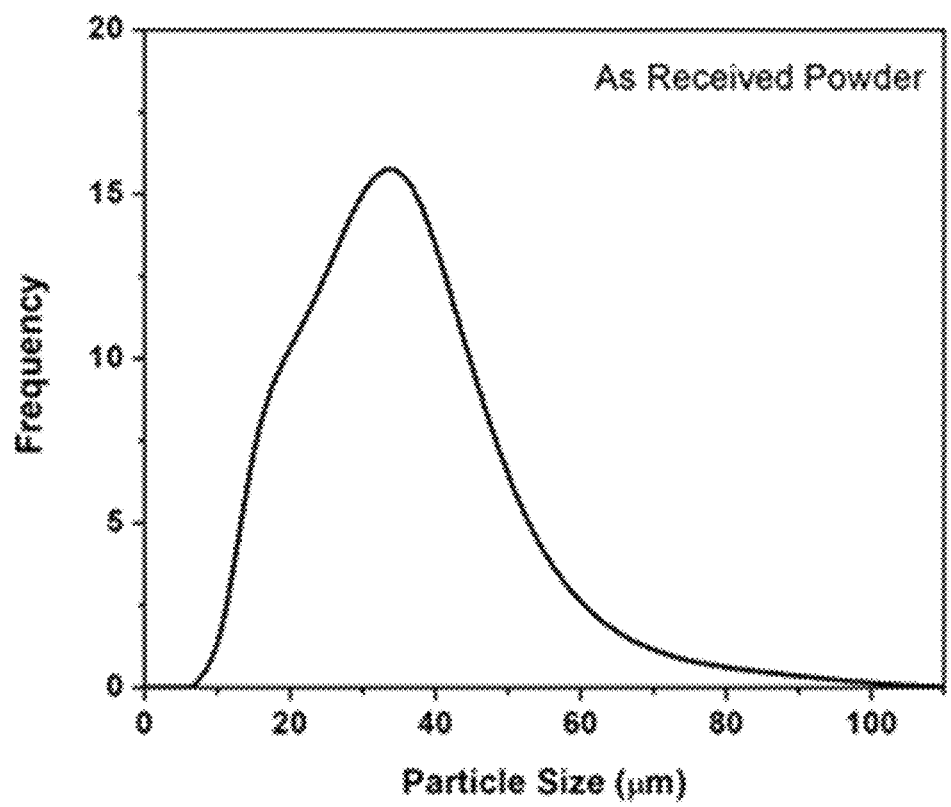
FIG. 1B shows the particle size distribution of the 52100-steel powder.
Figure 1C:
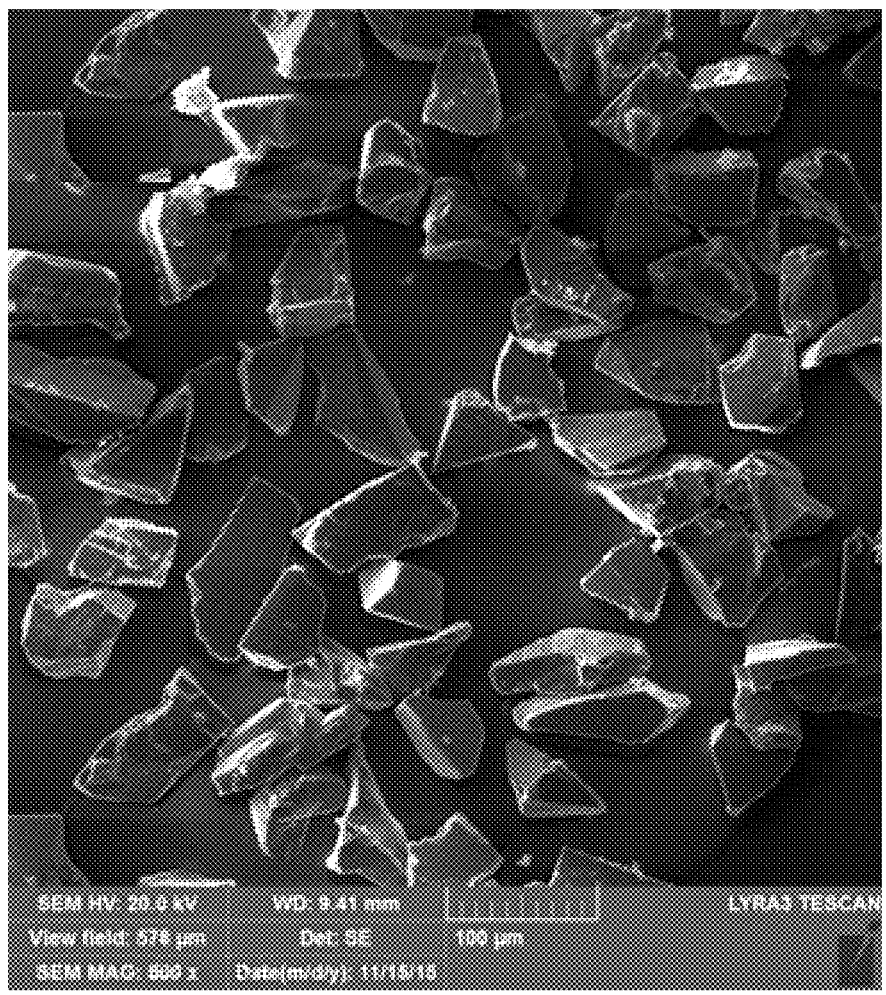
FIG. 1C shows FESEM image of the morphology of the c-BN powder.
Figure 1D:
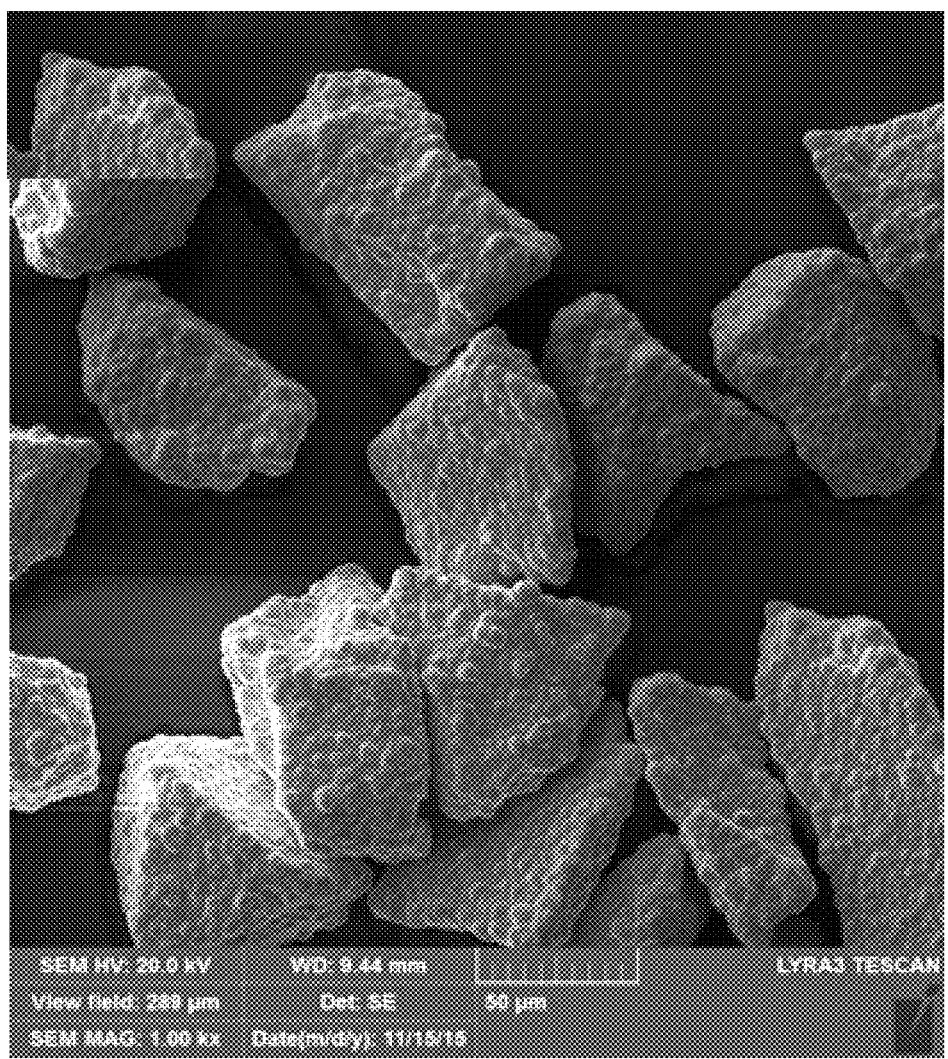
FIG. 1D shows FESEM image of the morphology of the c-BN powder coated with Ni.

Microstructural and Phase Analysis:

FIG. 1A is FESEM image of 52100 bearing steel showing its morphology, and FIG. 1B shows the size distribution of the particles. The particles have partially oblong spherical shape morphology and the size distribution analysis indicate that 50% of the powders are below 26.09 µm while 95% of the powders are below 47.53 µm. FIGS. 1C and 1D show the particle size of the cubic boron nitride (cBN) with and without Ni coating, respectively. The cBN particles have an average size of about 42 µm.

Figure 2A:
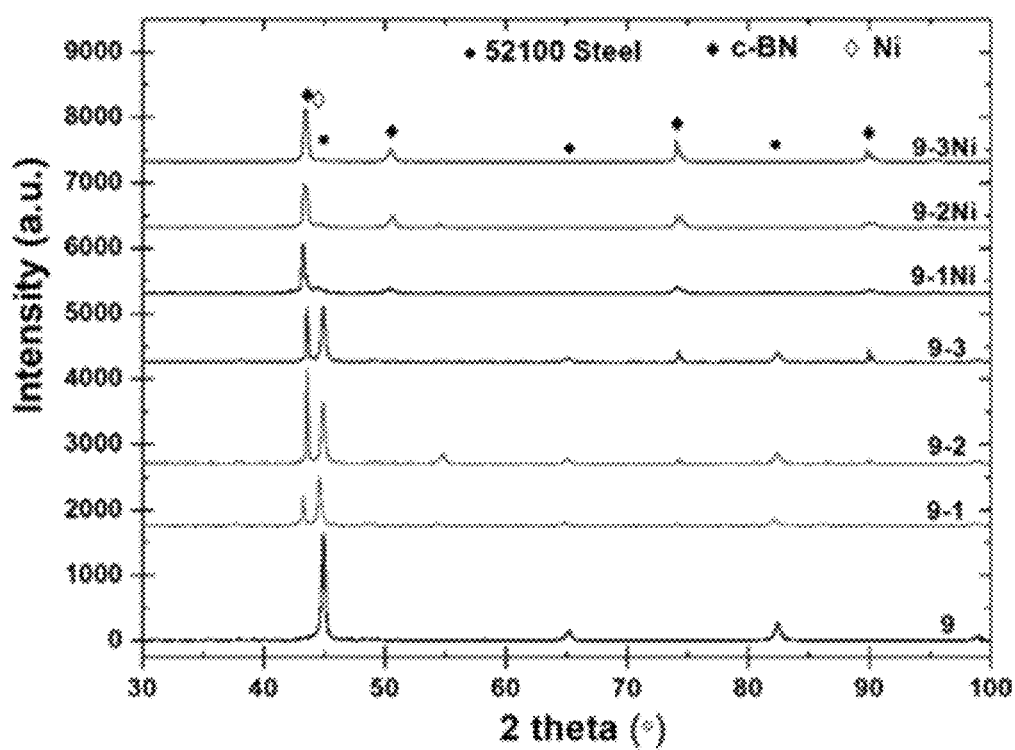
FIG. 2A shows X-ray diffraction (XRD) spectra of bearing steel 52100 (9), 52100 bearing steel comprising 10 wt. % (9-1), 20 wt. % (9-2), and 30 wt. % (9-3) c-BN, and bearing 52100 comprising 10 wt. % (9-1Ni), 20 wt. % (9-2Ni), and 30 wt. % (9-3Ni) c-BN coated with Ni sintered at 900° C.
Figure 2B:
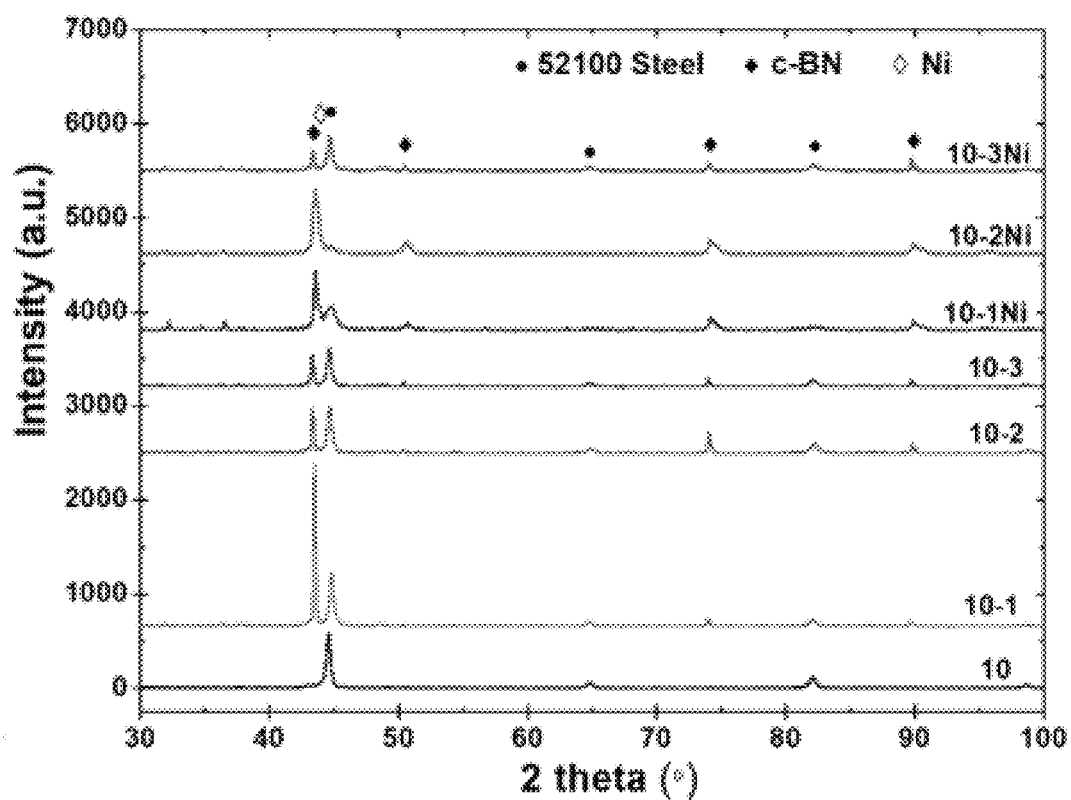
FIG. 2B shows XRD spectra of bearing steel 52100 (10), bearing steel 52100 comprising 10 wt. % (10-1), 20 wt. % (10-2), and 30 wt. % (10-3) c-BN, and bearing steel 52100 comprising 10 wt. % (10-1Ni), 20 wt. % (10-2Ni), and 30 wt. % (10-3Ni) c-BN coated with Ni sintered at 1000° C.

The XRD spectra of the sintered bearing steels and the bearing steel/cBN(Ni) composites sintered at 900 and 1000° C. are shown in FIGS. 2A and 2B. The pure bearing steel sintered at 900° C. showed the characteristic peaks at diffraction angles of 44.96, 65.20, 82.95 and 98.95°. It is observed that these peaks shifted to lower diffraction angles by 0.4, 0.39, 0.3 and 0.29°, respectively, as shown in Table 3.

TABLE 3

Peaks shift for pure steel

| Peaks # | 2θ (degree) of peaks of sample sintered at 900° C. | 2θ (degree) of peaks of sample sintered at 1000° C. | Difference in 2θ (degree) |
|---|---|---|---|
| 1 | 44.96 | 44.56 | 0.4 |
| 2 | 65.20 | 64.81 | 0.39 |
| 3 | 82.95 | 82.65 | 0.3 |
| 4 | 98.95 | 98.66 | 0.29 |

Figure 2C:
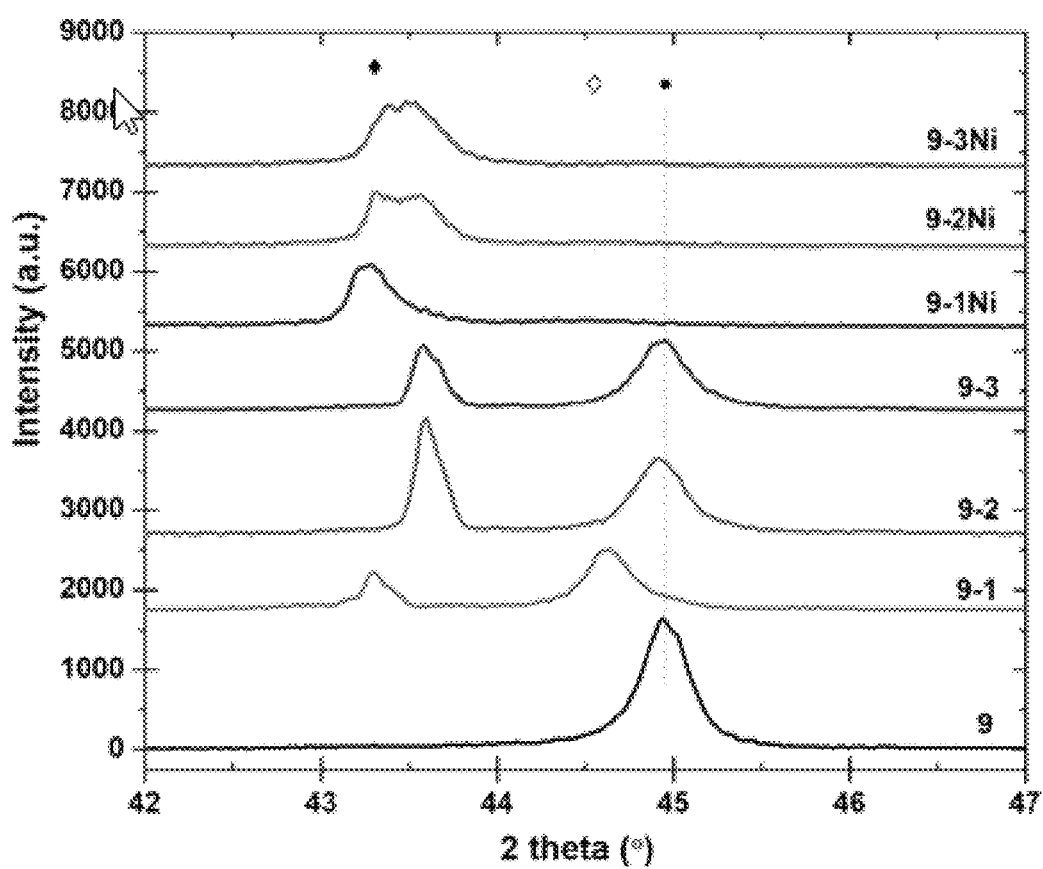
FIG. 2C shows expanded XRD spectra from 2θ 42° to 47° of FIG. 2A.
Figure 2D:
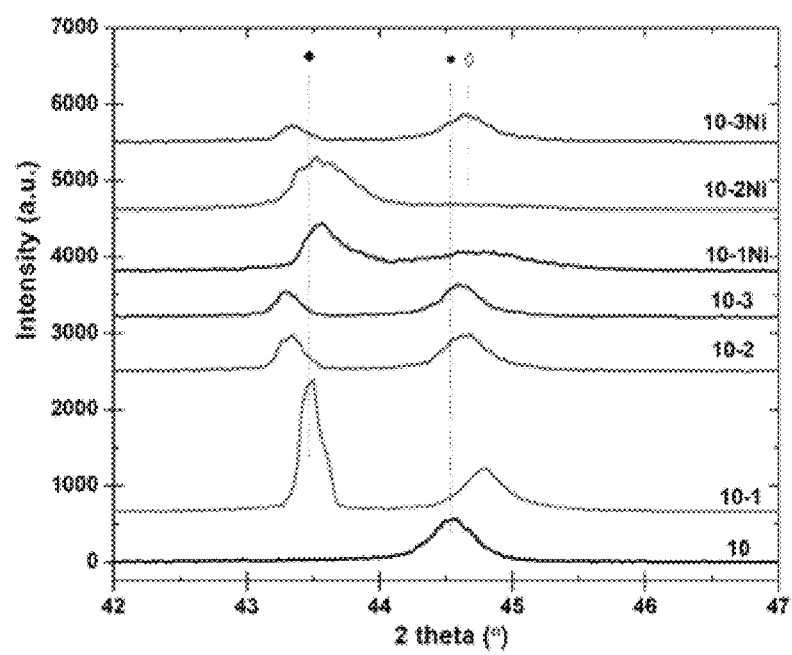
FIG. 2D shows expanded XRD spectra from 2θ 42° to 47° of FIG. 2B.
Figure 3A:
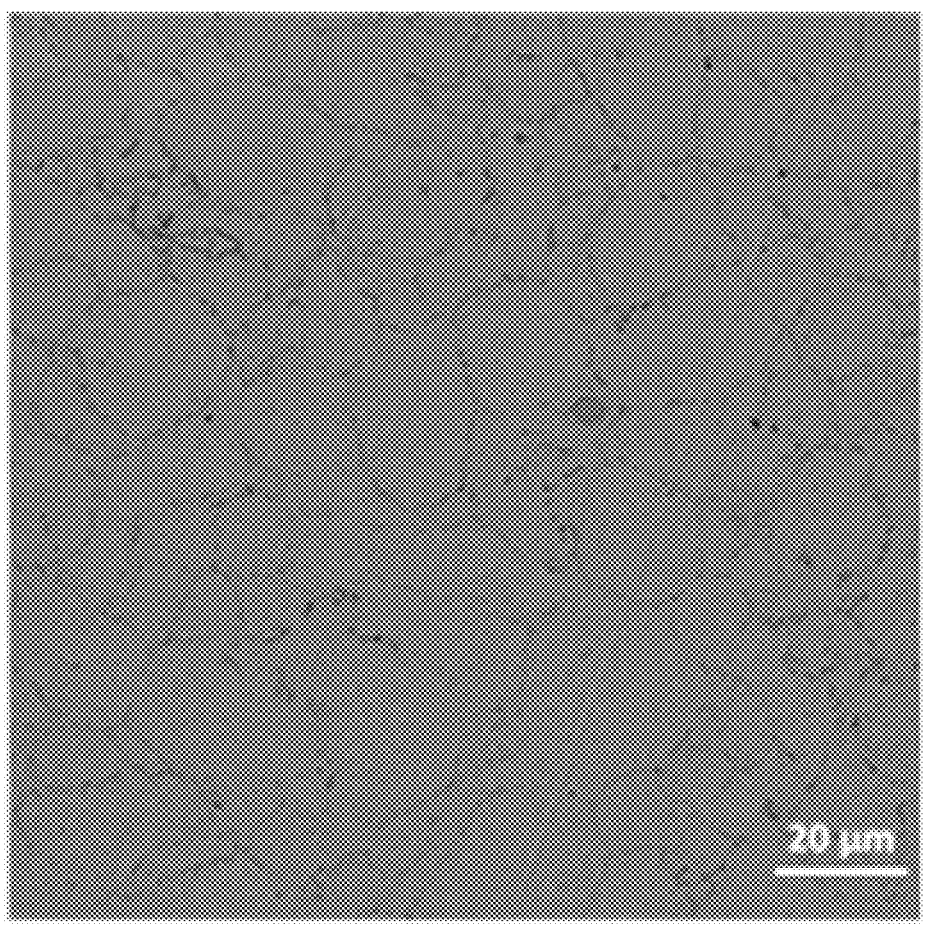
FIG. 3A shows FESEM images of polished of surface bearing steel sintered at 900° C. of pure bearing steel.
Figure 3B:
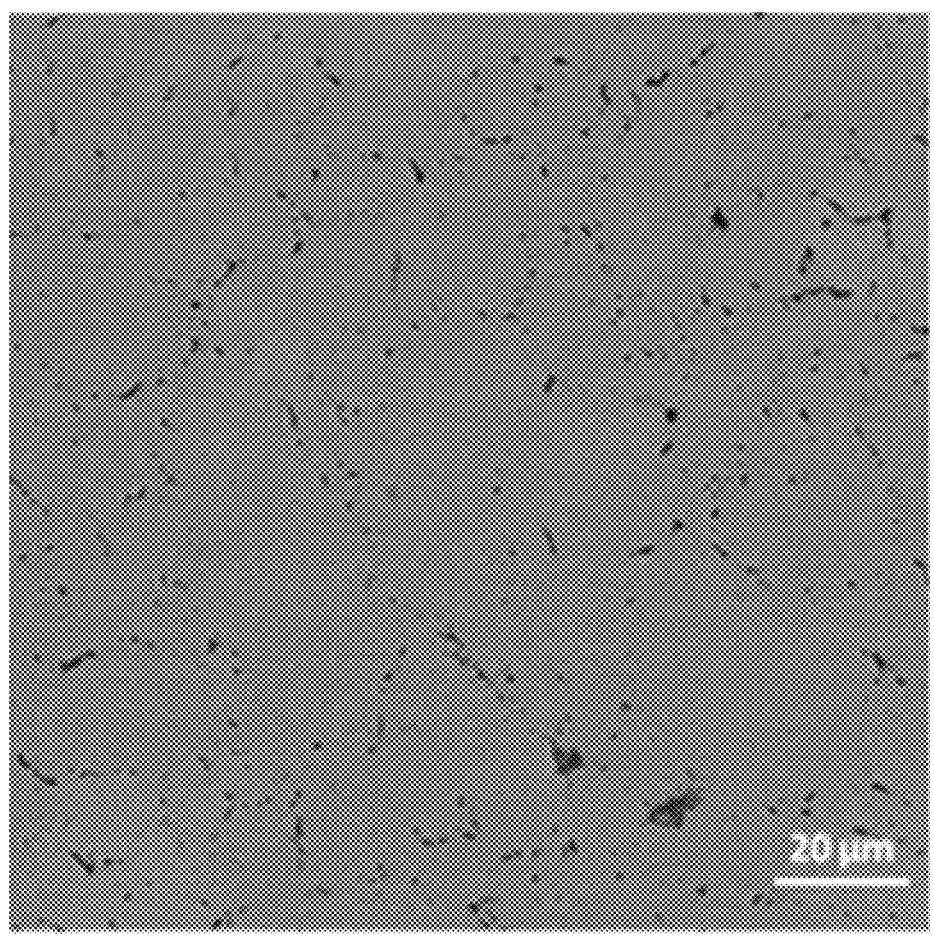
FIG. 3B shows FESEM images of polished of surface bearing steel sintered at 1000° C. of pure bearing steel showing.
Figure 3C:
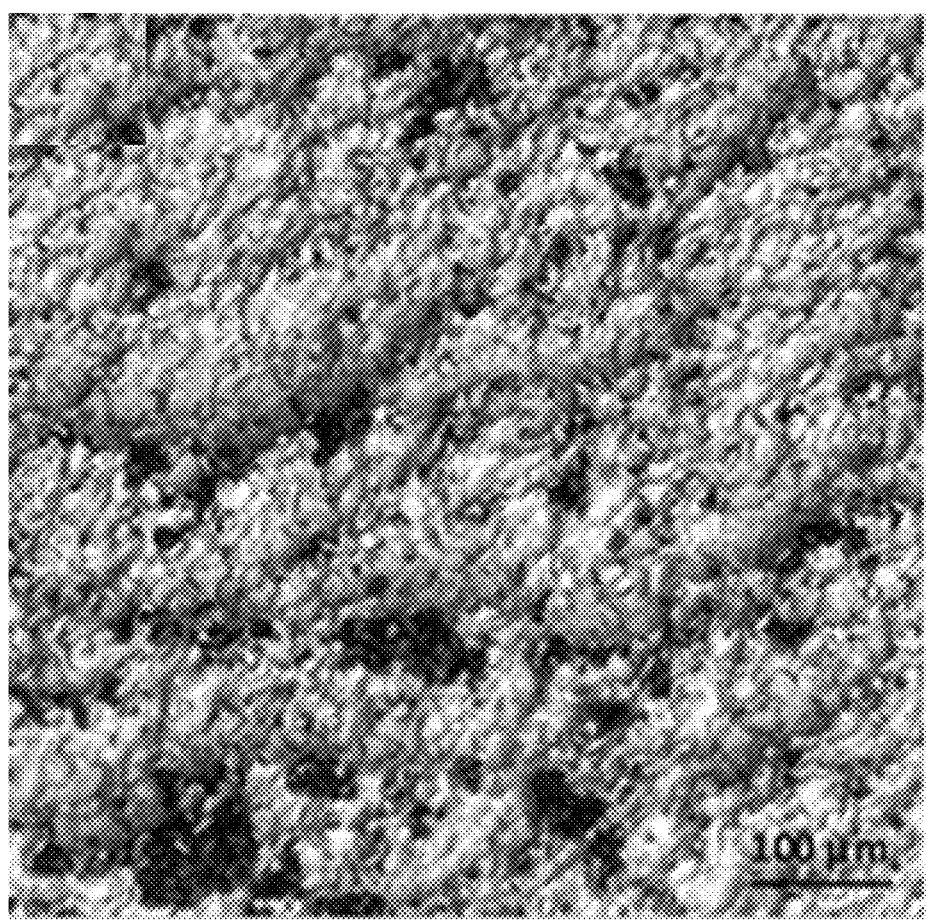
FIG. 3C shows FESEM images of fracture surface of bearing steel sintered at 900° C. of pure bearing steel showing.
Figure 3D:
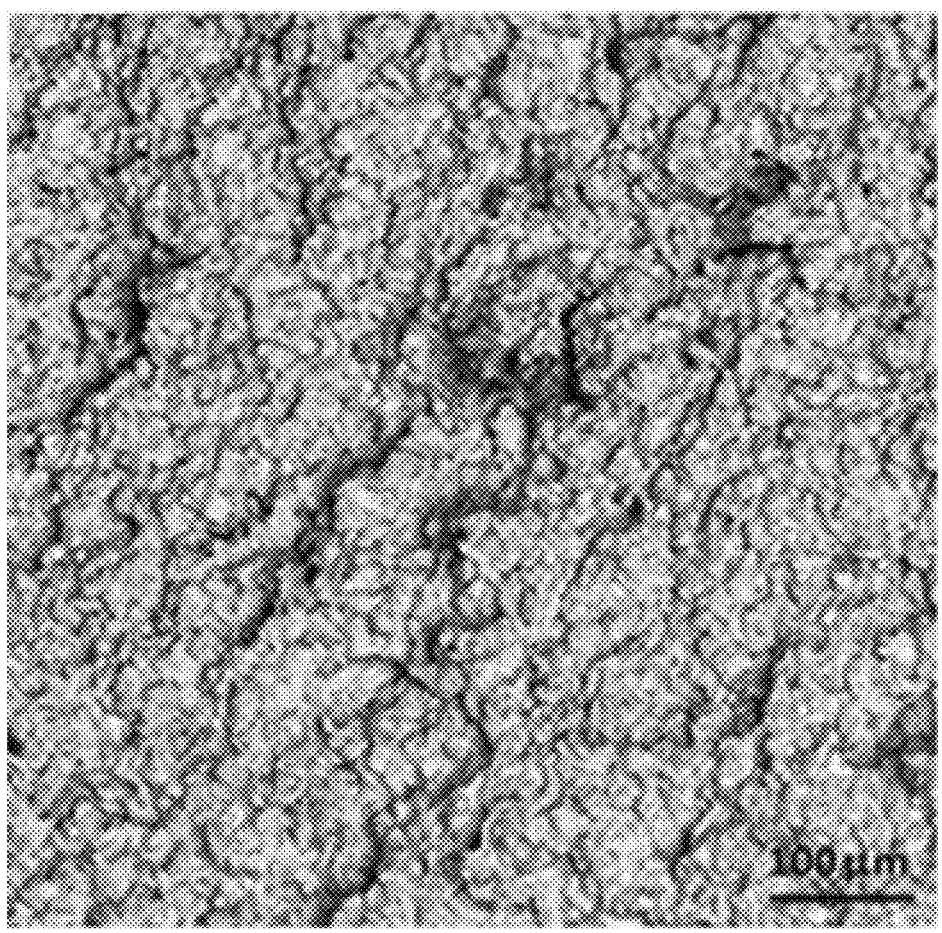
FIG. 3D shows FESEM images of fracture surface of bearing steel sintered at 1000° C. of pure bearing steel showing.
Figure 4A:
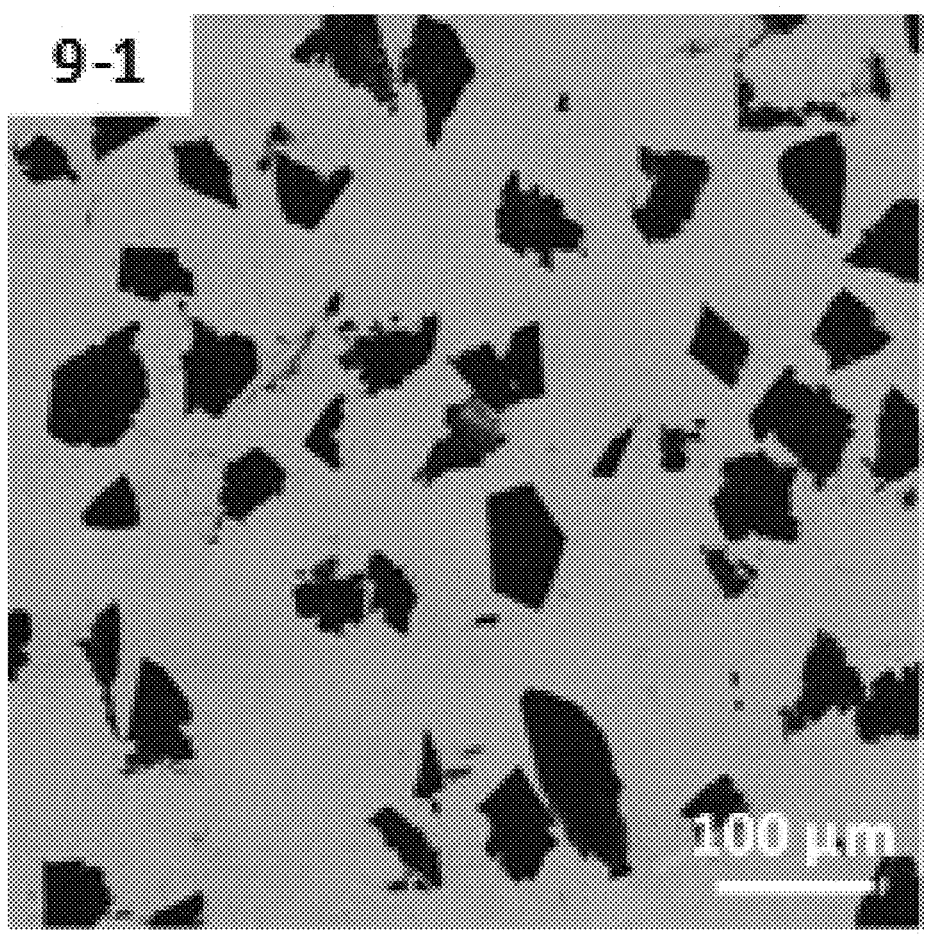
FIG. 4A shows SEM image of fracture surface of bearing steel 52100 comprising 10 wt. % (9-1) c-BN sintered at 900° C.
Figure 4B:
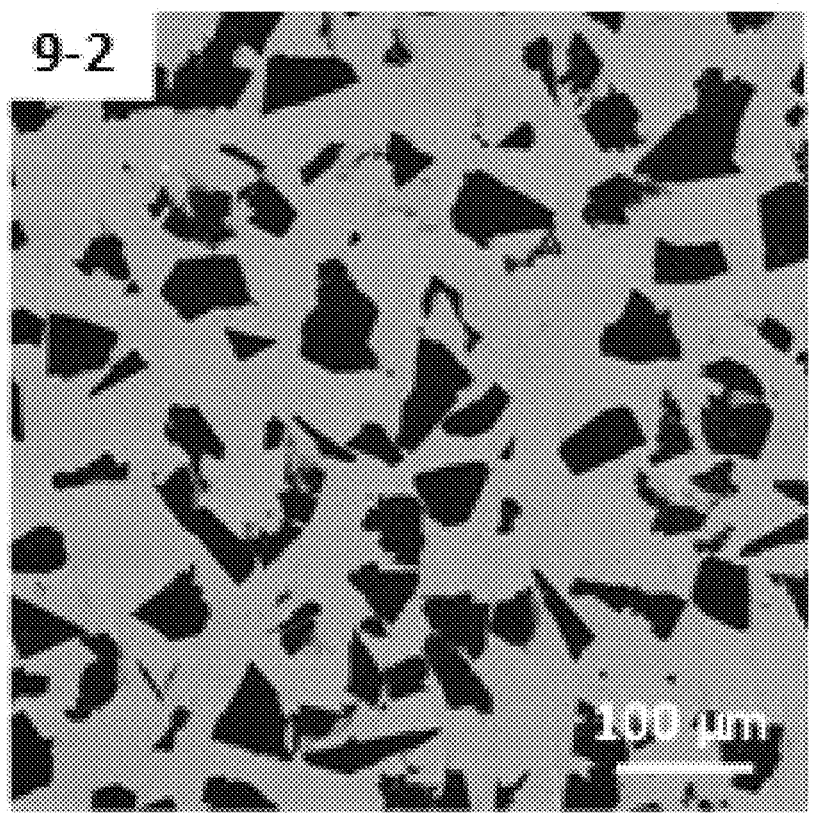
FIG. 4B shows SEM image of fracture surface of bearing steel 52100 comprising 20 wt. % (9-2) c-BN sintered at 900° C.
Figure 4C:
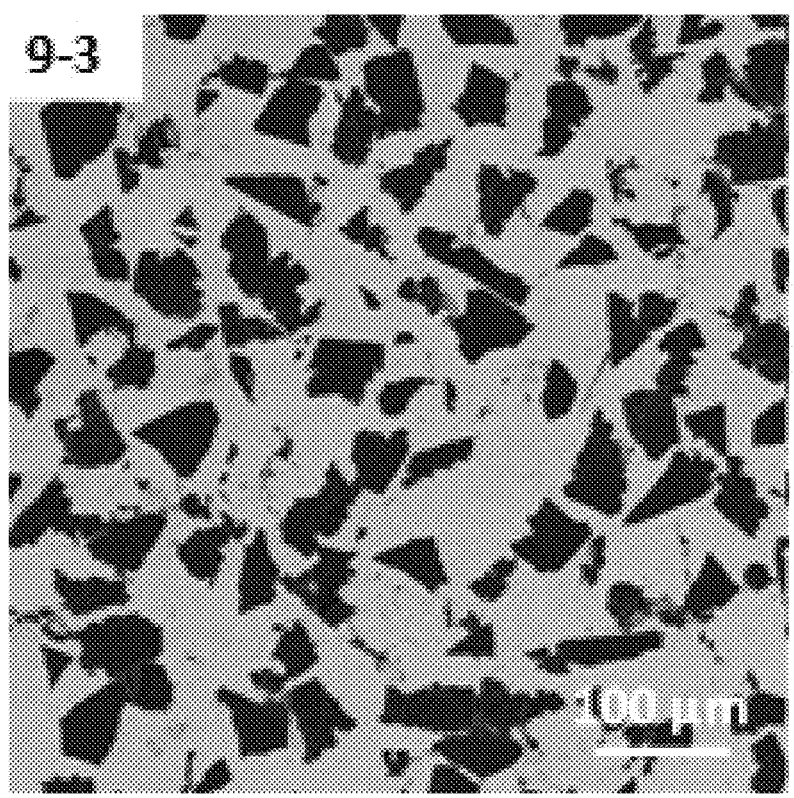
FIG. 4C shows SEM image of fracture surface of bearing steel 52100 comprising 30 wt. % (9-3) c-BN sintered at 900° C.
Figure 4D:
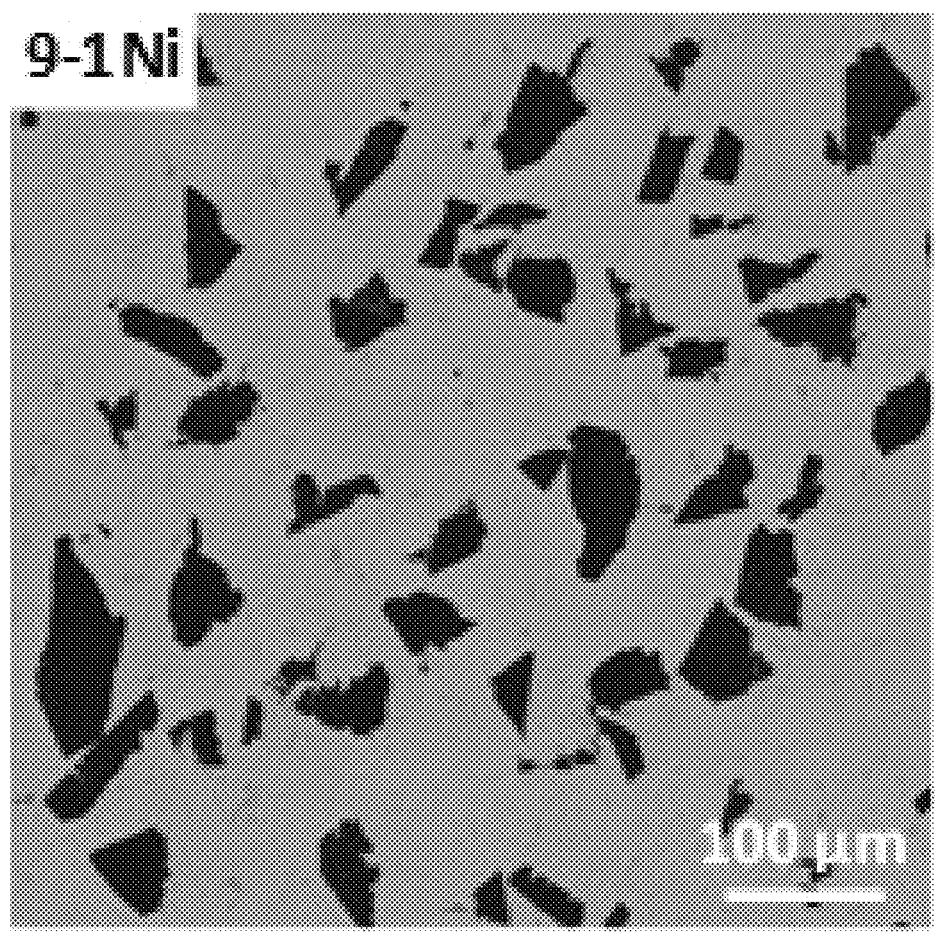
FIG. 4D shows SEM image of fracture surface of bearing steel 52100 comprising 10 wt. % (9-1Ni) c-BN coated with Ni sintered at 900° C.
Figure 4E:
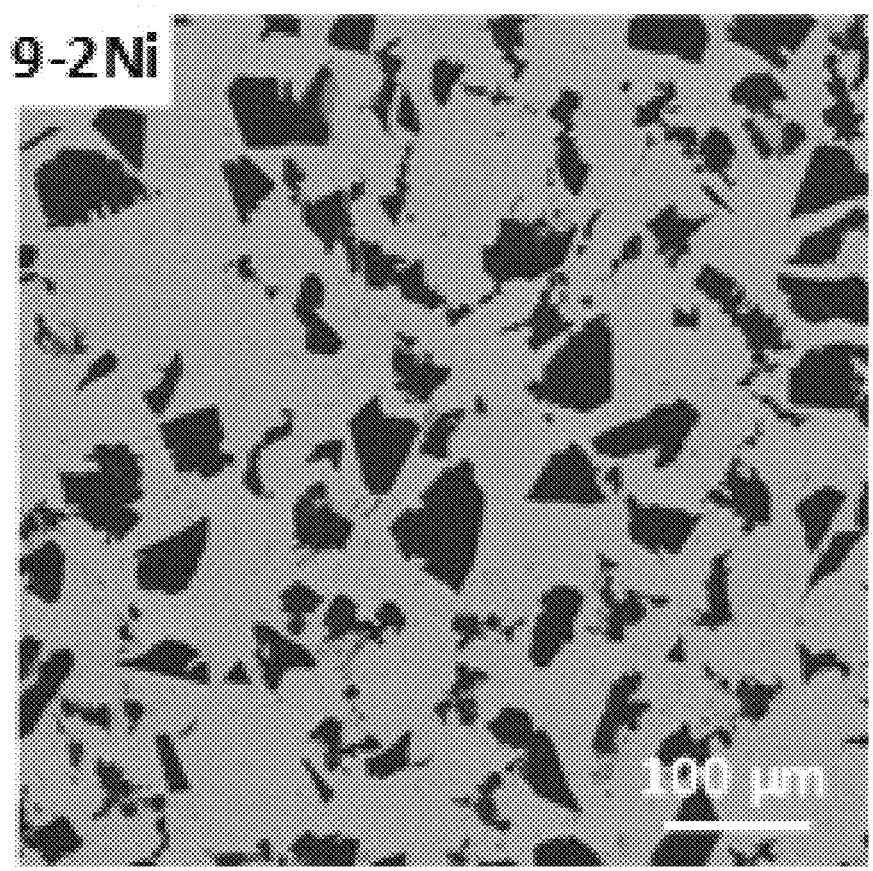
FIG. 4E shows SEM image of fracture surface of bearing steel 52100 comprising 20 wt. % (9-2Ni) c-BN coated with Ni sintered at 900° C.
Figure 4F:
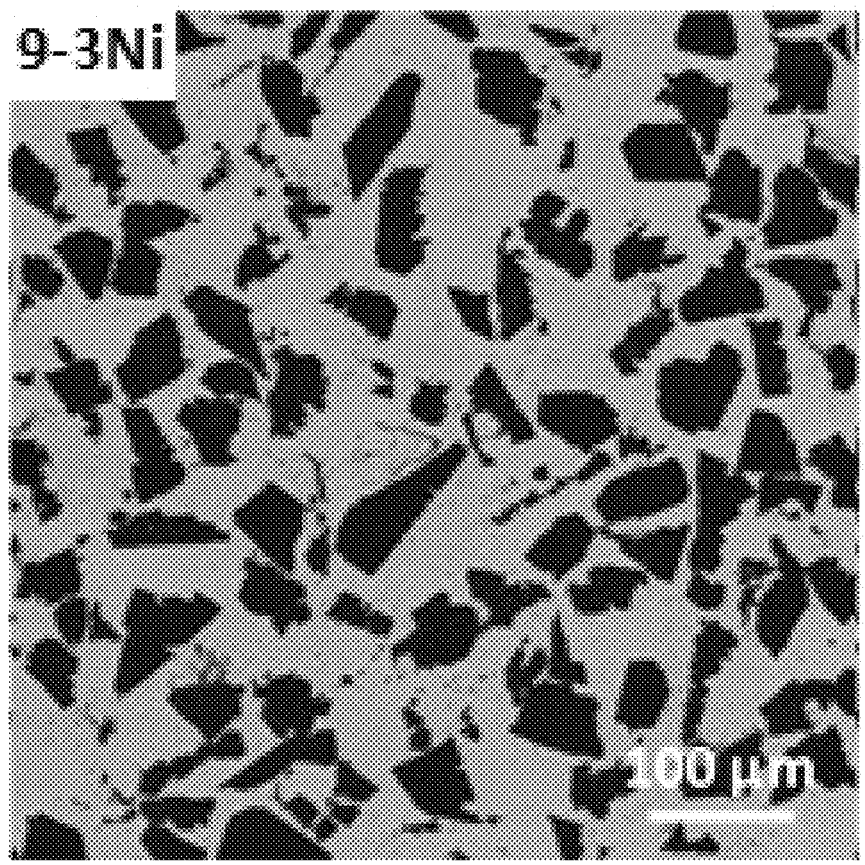
FIG. 4F shows SEM image of fracture surface of bearing steel 52100 comprising 30 wt. % (9-3Ni) c-BN coated with Ni sintered at 900° C.
Figure 5A:
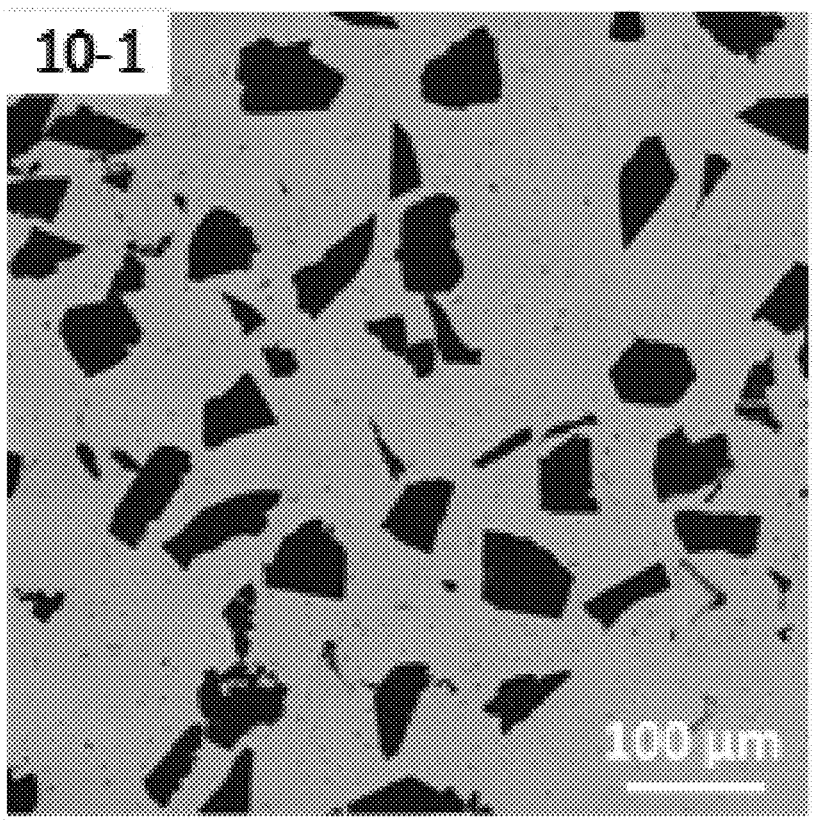
FIG. 5A shows SEM image of fracture surface of bearing steel 52100 comprising 10 wt. % (10-1) c-BN sintered at 1000° C.
Figure 5B:
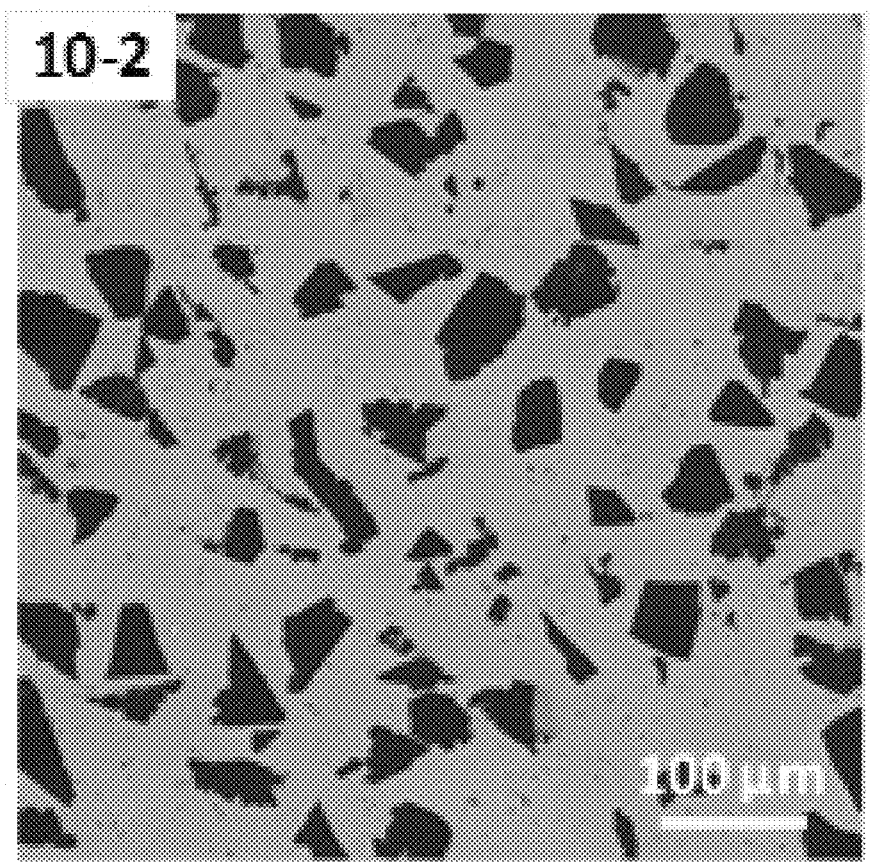
FIG. 5B shows SEM image of fracture surface of bearing steel 52100 comprising 20 wt. % (10-2) c-BN sintered at 1000° C.
Figure 5C:
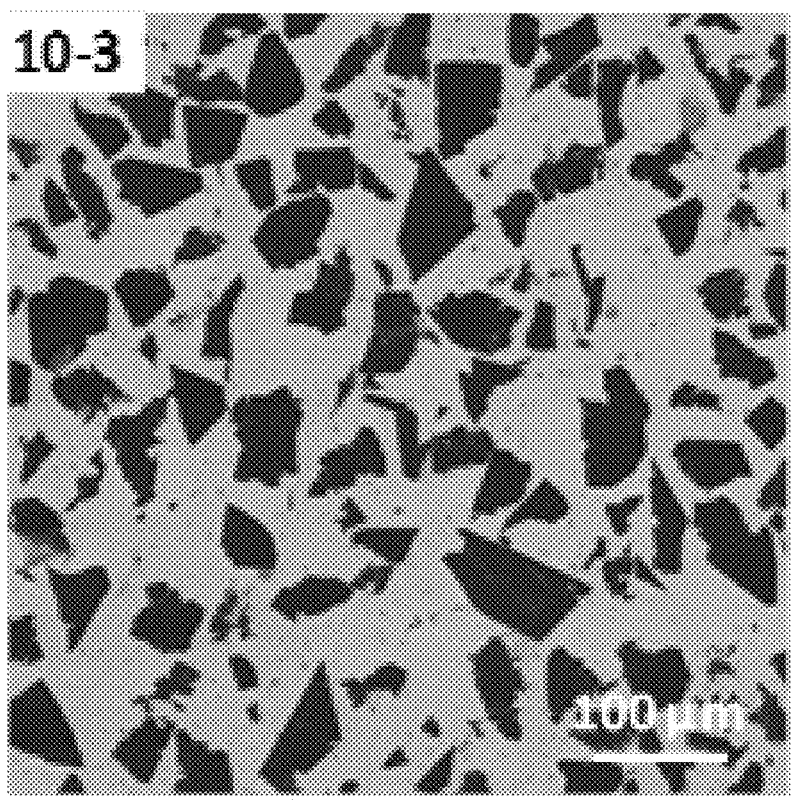
FIG. 5C shows SEM image of fracture surface of bearing steel 52100 comprising 30 wt. % (10-3) c-BN sintered at 1000° C.
Figure 5D:
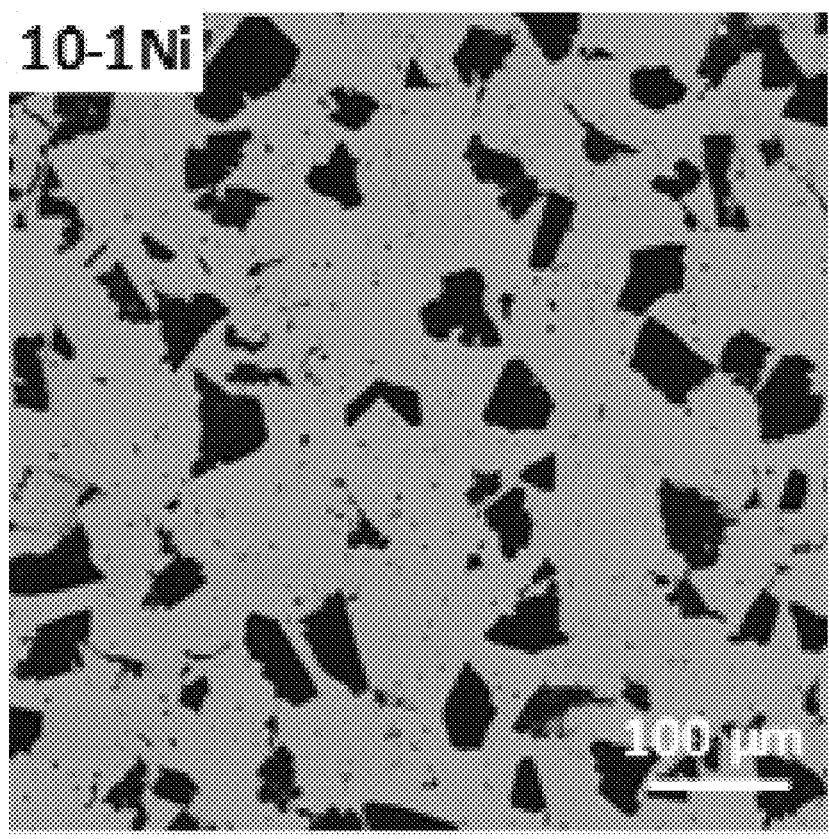
FIG. 5D shows SEM image of fracture surface of bearing steel 52100 comprising 10 wt. % (10-1Ni) c-BN coated with Ni sintered at 1000° C.
Figure 5E:
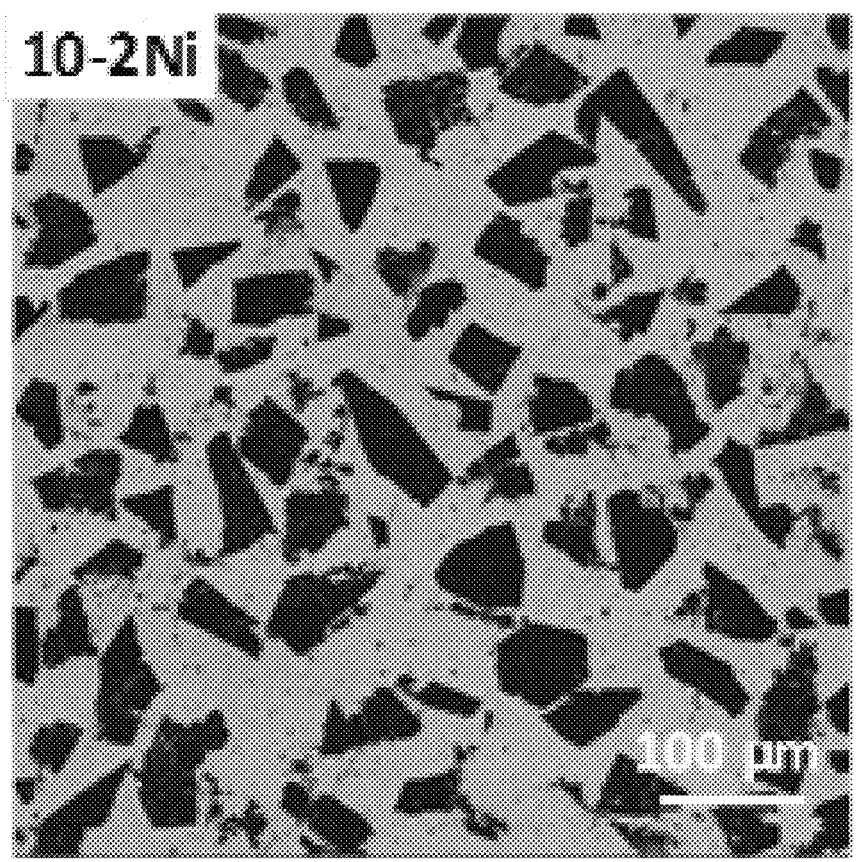
FIG. 5E shows SEM image of fracture surface of bearing steel 52100 comprising 20 wt. % (10-2Ni) c-BN coated with Ni sintered at 1000° C.
Figure 5F:
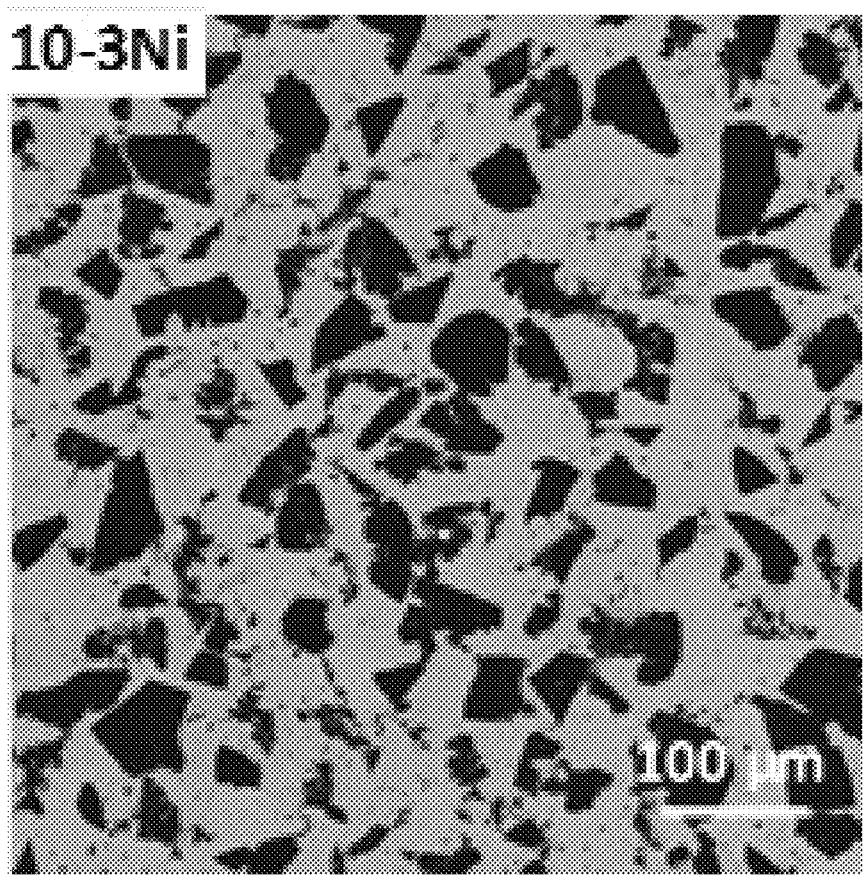
FIG. 5F shows SEM image of fracture surface of bearing steel 52100 comprising 30 wt. % (10-3Ni) c-BN coated with Ni sintered at 1000° C.

The shifts which decrease as the diffraction angles increase may be attributed to distortion in the lattice parameter as well as strain relaxation at higher sintering temperature. Also observed is the reduction and broadening of the peaks as evident from FIGS. 2C and 2D comparing spectra in FIGS. 2A-2B. That further emphasized the possibility of re-crystallization and a decrease in grain size, when the pure steel was sintered at 1000° C.

With the addition of the cBN reinforcement of samples sintered at 900° C., it is observed that the peak intensity of the steel is reduced incrementally from 10 wt. % to 30 wt. % cBN without coating. In contrast, with the addition of 10 to 30 wt. % Ni coated cBN, the XRD peaks of steel were not detected at their characteristic 2θ angles. Two possible hypotheses may explain the observed results: (i) the Ni coating enhances the heat conductivity and efficiency during the sintering leading to severe distortion of the lattice and/or (ii) chemical interaction occur between the Ni coating and the steel matrix leading to phase transformation. The yielded peaks for Ni coated cBN bearing steel composites, observed at a diffraction angle corresponding to 43.25°, exhibited significant broadening of the beak as shown in FIG. 2C (spectra 9-1Ni, 9-2Ni and 9-3Ni). That indicates smaller grains or crystallites, which may substantiate the fact that phase transformation did indeed occur in the matrix. The reduction in the peak intensity at 900° C. for BN reinforced bearing steel and its subsequent disappearance in Ni-coated cBN composite sample (sintered at 900° C.) reflect the difference between the pure steel sintered at 900° C. and composite sintered at 900° C.

A similar trend was observed for the sintered steel/cBN (without and with Ni coating) composites at 1000° C. (FIGS. 2B and 2D). With the addition of cBN, the characteristic peak intensities and full width at half maximum intensity (FWHM) of the peaks are reduced indicating lattice distortion and possible grain growth to reduce the internal energy accompanying the increased cBN reinforcement. The incorporation of the Ni-coated cBN as a reinforcement results in the loss of the characteristic peak of the bearing steel at 2θ of 44.56° and the yielding of new peak at 2θ of 43.57° which is slightly shifted from the characteristic peak of cBN at 2theta of 43.48° (Spectrum 10-1Ni in FIG. 2D). Increasing the percentage of Ni coated cBN reinforcement in the matrix to 20 wt. % further leads to further broadening in the FWHM, which is associated with increased diffusion of the Ni into the steel matrix. On the other hand, the characteristic peaks of steel as well as cBN were again detected at 30 wt. % of Ni-coated cBN reinforcement, which may be due to draining, leaking, or melting out of Ni from the matrix. Thus, it appears that the transformation of the phase was reversed due to loss of Ni. The significant loss of Ni for the 30 wt. % Ni coated cBN reinforced composite may be associated with increased thermal efficiency at the interface due to increased Ni concentration such that the interfacial temperature may be extremely high to result in burning/melting out of Ni.

The diffusion of Ni from the coated cBN into the steel matrix influenced the composition of the matrix and enhanced the phase transformation from a magnetic to a non-magnetic phase. Also, earlier studies have reported the diffusion of Ni into the matrix during SPS processing [Irshad et al. "Effect of precursor size on the structure and mechanical properties of calcium-stabilized sialon/cubic boron nitride nanocomposites" J Alloys Compd (2017); 728:836-43. doi:10.1016/j.jallcom.2017.09.032; and Irshad et al. "Investigation of the structural and mechanical properties of micro-/nano-sized $Al_2O_3$ and cBN composites prepare by spark plasma sintering" Ceram Int (2017); 43:10645-53, each incorporated herein by reference in their entirety]. Compositional analysis of the SPS sintered matrix revealed a near Ni-based alloy composition and hence, the observed loss in the magnetic property which results in a better corrosion resistance.

FIGS. 3A-3D show the polished and fracture surfaces of the pure bearing steel after being sintered at 900 and 1000° C. The observed microstructure revealed that the temperatures are effective for sintering the steel and obtaining relatively dense samples. Pores can also be noticed in both samples and they are mainly observed around the grain boundaries. As can be observed from FIGS. 3A and 3B, pores in the sample sintered at 900° C. are relatively smaller and only clearly visible at higher magnification. However, with an increased sintering temperature of 1000° C., the pores become disconnected, coalesced and spherical, and thus, become easily observable. That is inherent in the sintering process where particles of varying sizes coalesce and coarsen through diffusion during heating [German, R. M. "Coarsening in sintering: Grain shape distribution, grain size distribution, and grain growth kinetics in solid-pore systems" Crit Rev Solid State Mater Sci (2010) 35:263-305, doi:10.1080/10408436.2010.525197, incorporated herein by reference in its entirety]. Furthermore, inter-diffusion, phase transformation, or material loss during sintering can lead to an increase in porosity at higher sintering temperatures [Makena et al. "Influence of Temperature on Microstructure and Mechanical Properties of Ni-40Fe-10Co Alloy Consolidated by Spark Plasma Sintering" Procedia Manuf (2017) 7:708-13, doi:10.1016/j.promfg.2016.12.105, incorporated herein by reference in its entirety]. The average grain size of sample sintered at 900° C. was estimated to about 15 µm and lower than that of the sample sintered at 1000° C. which has an average grain size of about 27 µm. The grain growth at a higher temperature can be associated with the higher heat input which is favored due to the need to reduce the high internal stresses. It could not be confirmed, if the observed grain growth occurred after or prior to full densification. However, with the observed coalesces and spherical morphology of the pores at a higher temperature, grain growth may occur prior to full densification. The fracture surface shown in FIGS. 3C and 3D of the samples sintered at 900 and 1000° C., respectively, revealed a slightly different failure mechanism. Sample sintered at 900° C. exhibited a ductile fracture evident with the presence of dimples and rougher surface signifying plastic deformation prior to fracture. In contrast, sample sintered at 1000° C. fractured in a brittle manner with observable cracks on the fracture surface.

FESEM images of the polished composites are shown in FIGS. 4A-4F and 5A-5F for samples sintered at 900 and 1000° C., respectively. They show that uniform distribution of the cBN particles in the bearing steel matrix was attained at both sintering temperatures. Also, pores were seen in the matrix of the sintered samples and were relatively lesser for samples sintered at 1000° C. than those sintered at 900° C. The increased porosity of the sample sintered at 900° C. can be associated with the low temperature, i.e., a lesser heat input may lead to reduced densification. Pores formation were attributed to transformation of cBN to hBN and the distortion and deformation of cBN particles in cBN (without and with Ni coating) reinforced alumina composites SPS sintered at 1400° C. However, the transformation of cBN to hBN and the distortion of the cBN particles were not observed in the current study, which may be due to the comparatively lower sintering temperatures used as well as the ductile nature of the matrix.

Example 4

Density and Mechanical Properties:

The density and the mechanical properties of the bearing steel/cBN without and with Ni coating composites are shown in Tables 4 and 5. The density of the unreinforced bearing steel sintered at 900° C. is slightly lower than that of the sample 1000° C. This is inconsonant with the observed in the FESEM images (FIGS. 3A and 3B) which shows higher porosity in the sample sintered at 900° C., and the subsequent increase in grain size for samples sintered at 1000° C. due to coalescence. Porosity of SPS sintered sample may be reduced with an increase in the grain size. The relative densities of the sintered pure bearing steel shown Tables 4 and 5 further reinforced the fact that after sintering at temperature of 1000° C., full densification was not attained. Also, the decrease in porosity and an increase in the grain size are due to the system moving toward lower interfacial energy as a result of interdiffusion of particles. With the addition of the cBN reinforcement, it is observed that samples sintered at 1000° C. exhibited higher density which is justifiable by the higher temperature yielding better densification and thus, lower porosity in the composites. In contrast, the density was reduced by about 94, 90 and 63% with the addition of 10, 20 and 30 wt. % Ni coated cBN, respectively. The gradual dissolution of the Ni into the steel matrix can account for the density reduction in the 10 and 20 wt. % Ni coated cBN reinforced bearing steel composites. Also, leaking out of the Ni material may have contributed to the reduction of density. The sharp decline of densification observed for bearing steel containing 30 wt. % Ni coated This result corroborates the observation from the X-ray diffraction analysis as shown in FIGS. 2A-2D.

Similarly, the mechanical properties as depicted by the hardness (HRC) in Tables 4 and 5 follow the trend of the density. Typically, a decrease in the material density signifies a reduction in mechanical properties. It is important to note that the composite material is in an annealed state. Hardness improved after the conventional heat treatment procedure. cBN reinforced bearing steel composite attained its improved hardness via a hard second reinforcement and precipitation of carbide. However, the Ni-coated cBN reinforced bearing steel composite can attain the improved hardness via the presence of a second hard phase, the dissolution of Ni in the matrix to form a solid solution and possible carbide precipitation during heat treatment. It is observed that the melting out of Ni deteriorated the mechanical properties of the annealed Ni coated cBN reinforced composites as shown in Tables 4 and 5. However, with appropriate heat treatment process, the mechanical properties may be substantially improved based on the aforementioned mechanism.

TABLE 4

| | | SPS synthesized at 900° C. | | | | | | |
|---|---|---|---|---|---|---|---|---|
| Sample ID | | 9 | 9-1 | 9-2 | 9-3 | 9-1Ni | 9-2Ni | 9-3Ni |
| Properties | | 52100 Steel | 10% c-BN | 20% c-BN | 30% c-BN | 10% c-BN/Ni | 20% c-BN/Ni | 30% c-BN/Ni |
| Density (g/cm$^3$) | | 7.69 | 6.83 | 6.08 | 5.31 | 6.93 | 6.27 | 5.68 |
| Theoretical Density (g/cm$^3$) | | 7.83 | 6.87 | 6.14 | 5.56 | 7.15 | 6.71 | 6.39 |
| Relative Density (%) | | 98.17 | 99.40 | 99.02 | 95.59 | 96.93 | 93.54 | 88.91 |
| Hardness (HRC) | | 48 | 53 | 52 | 50 | 47 | 48 | 44 |
| Thermal expansion (ppm/K) | | 12.54 | 11.01 | 10.24 | 8.65 | 13.13 | 12.26 | 11.39 |
| Thermal Effusivity at RT | | 10933 | 10970 | 10935 | 10927 | 8263 | 9073 | 9041 |
| Thermal Conductivity | 25° C. | 33 | 34 | 32 | 33 | 18 | 21 | 22 |
| (W/m · .K) | 50° C. | 14 | 13 | 9 | 11 | 18 | 18 | 19 |
| | 70° C. | 15 | 14 | 9 | 10 | 17 | 16 | 17 |
| | 100° C. | 14 | 14 | 10 | 10 | 15 | 14 | 13 |

TABLE 5

| | | SPS synthesized at 1000° C. | | | | | | |
|---|---|---|---|---|---|---|---|---|
| Sample ID | | 10 | 10-1 | 10-2 | 10-3 | 10-1Ni | 10-2Ni | 10-3Ni |
| Properties | | 52100 Steel | 10% c-BN | 20% c-BN | 30% c-BN | 10% c-BN/Ni | 20% c-BN/Ni | 30% c-BN/Ni |
| Density (g/cm$^3$) | | 7.71 | 6.71 | 6.10 | 5.38 | 6.75 | 6.10 | 4.00 |
| Theoretical Density (g/cm$^3$) | | 7.83 | 6.87 | 6.14 | 5.56 | 7.15 | 6.71 | 6.39 |
| Relative Density (%) | | 98.46 | 97.55 | 99.45 | 96.74 | 94.39 | 90.94 | 62.62 |
| Hardness (HRC) | | 50 | 53 | 55 | 53 | 47 | 45 | 41 |
| Thermal expansion (ppm/K) | | 12.81 | 11.09 | 11.1 | 9.65 | 13.45 | 12.15 | 10.85 |
| Thermal Effusivity at RT | | 10995 | 10854 | 10044 | 10759 | 8468 | 9662 | 8892 |
| Thermal Conductivity | 25° C. | 34 | 33 | 31 | 32 | 19 | 24 | 22 |
| (W/m · K) | 50° C. | 24 | 15 | 13 | 25 | 9 | 23 | 18 |
| | 70° C. | 22 | 15 | 12 | 23 | 8 | 20 | 15 |
| | 100° C. | 19 | 12 | 9 | 11 | 6 | 18 | 14 | indicates that material draining, leaking, or melt out is significant during the sintering process. That was observed during the sintering process. A possible reason may be due to highly localized heat at the interface sequel the high temperature and the high thermal conductivity of Ni. Such a localized increase in temperature at the interface coupled with pressure results in localized melting and the subsequent ejection of the molten material. The material loss was relatively considerable for 30 wt. % Ni coated cBN reinforced steel due to the large volume of Ni in the composite.

Figure 6A:
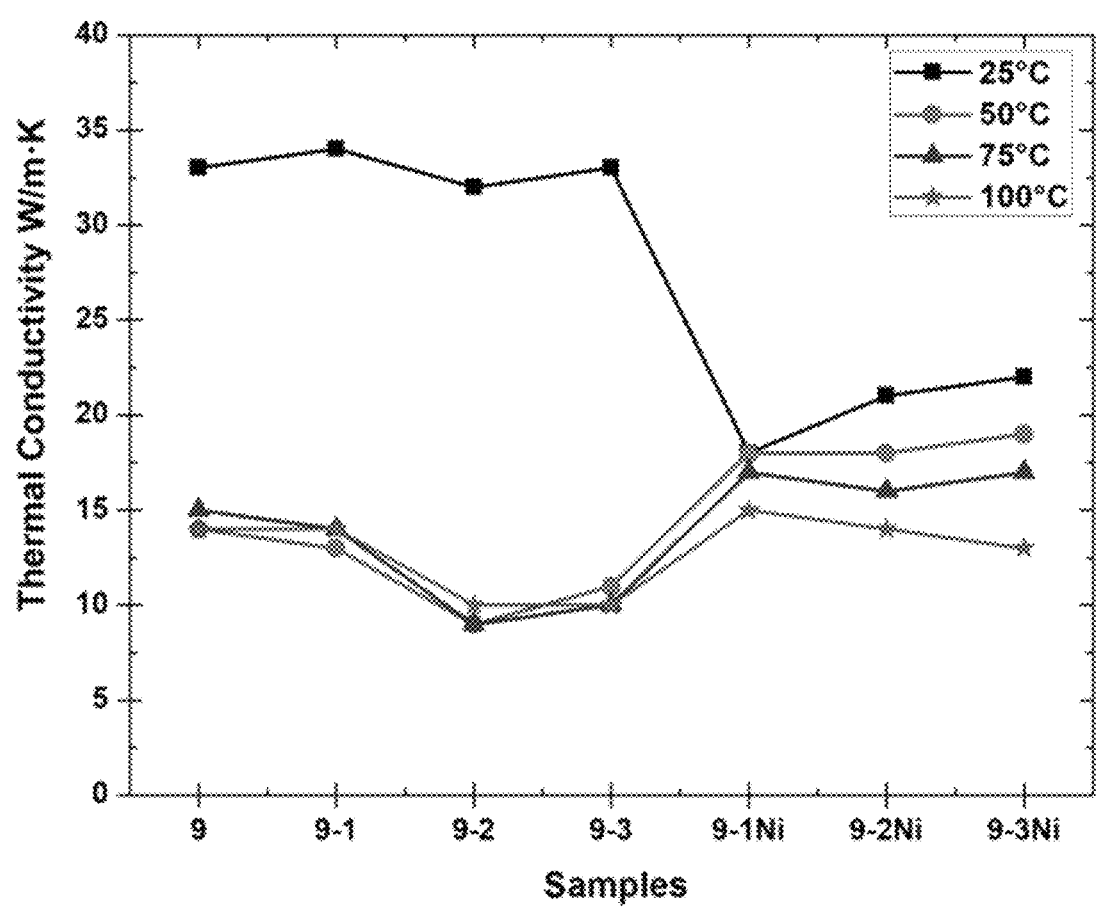
FIG. 6A shows a plot of the thermal conductivity vs samples composition: bearing steel 52100 (9), bearing 52100 comprising 10 wt. % (9-1), 20 wt. % (9-2), and 30 wt. % (9-3) c-BN, and bearing 52100 comprising 10 wt. % (9-1Ni), 20 wt. % (9-2Ni), and 30 wt. % (9-3Ni) c-BN coated with Ni sintered at 900° C. at different temperatures of the SPS samples.
Figure 6B:
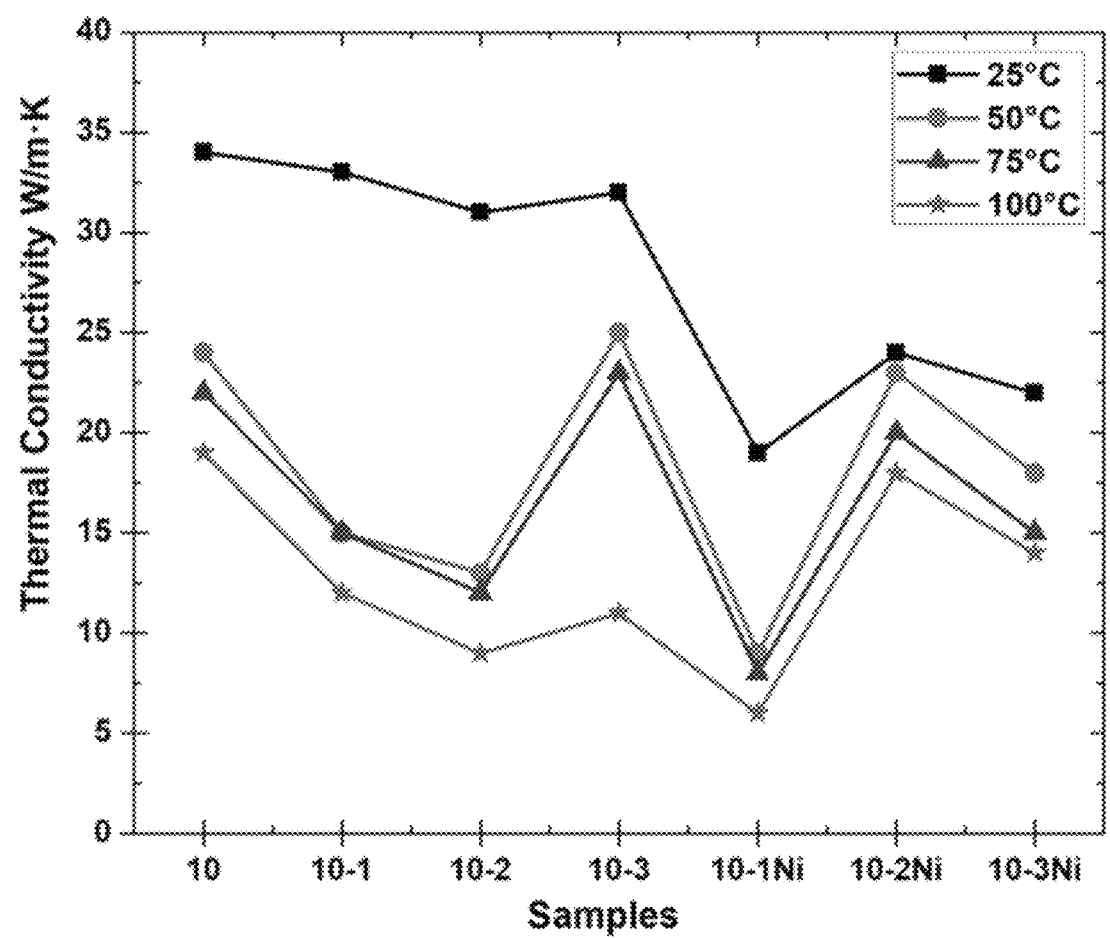
FIG. 6B shows a plot of the thermal conductivity vs samples composition: bearing steel 52100 (10), bearing 52100 comprising 10 wt. % (10-1), 20 wt. % (10-2), and 30 wt. % (10-3) c-BN, and bearing 52100 comprising 10 wt. % (10-1Ni), 20 wt. % (10-2Ni), and 30 wt. % (10-3Ni) c-BN coated with Ni sintered at 1000° C. at different temperatures of the SPS samples.

The thermal properties of the composites revealed the influenced of both the SPS process and reinforcement. It is observed that the thermal properties of the SPS sintered pure 52100 bearing steel was comparable with the typical properties of the conventionally manufactured bearing steel which is usually between 30-40 W/m·K. SPS sintered pure bearing steel demonstrated almost similar thermal conductivity at both temperatures, though that of the sample sintered at 1000° C. was marginally higher. The cBN reinforcement does not seem to drastically affect the thermal properties as no considerable difference was observed with the addition of up to 30 wt. % cBN. This behaviour was the same for samples sintered at both temperatures. In contrast, when the Ni-coated cBN was used in the reinforcement, a drastic effect was observed in the thermal properties. FIGS. 6A and 6B show the effects of adding cBN and Ni coated cBN reinforcement into the steel matrix as well as the effect of measuring temperature on samples sintered at both 900 and 1000° C., respectively. It is noteworthy that the sharp drop in the thermal conductivity measured at 25° C. (room temperature) for the Ni-coated cBN reinforced composites. That further indicates that Ni dissolves in the matrix causing transformation of the matrix into a near non-magnetic ferronickel type alloy. The results suggest that the transformation to non-magnetic phase was well accomplished with the 10 wt. % Ni coated cBN reinforcement. Though, more Ni was dissolved in the matrix with the further addition of the Ni-coated cBN reinforcement, the melting out and ejection of Ni through material loss due to localized melting from the mould may have resulted in a reduced amount of Ni in the composites. That explains the slight increment in thermal conductivity of the samples with higher Ni coated cBN composition as can be observed in FIG. 6B. The effect of temperature on thermal conductivity is obvious in FIGS. 6A and 6B. An increase in the temperature caused the decrement in the thermal conductivity of all samples. That is a typical behaviour of metals whereby their thermal conductivity decreased at elevated temperatures due to the increased in molecular vibration at higher temperature. The increase in molecular vibration reduces the free mean path of the molecules as well as obstructs the free flow of electrons and thus, the thermal conductivity is decreased. As it can be seen in FIGS. 6A and 6B, no significant reduction in thermal conductivity in the range of 50 to 100° C. was observed for cBN reinforced composite samples. However, Ni-coated cBN reinforced composites revealed a further decreased in thermal conductivity as the temperature increased from 50 to 100° C. Such a trend agrees with the Ni dissolution and stimulant in the transformation of the matrix.

Figure 7:
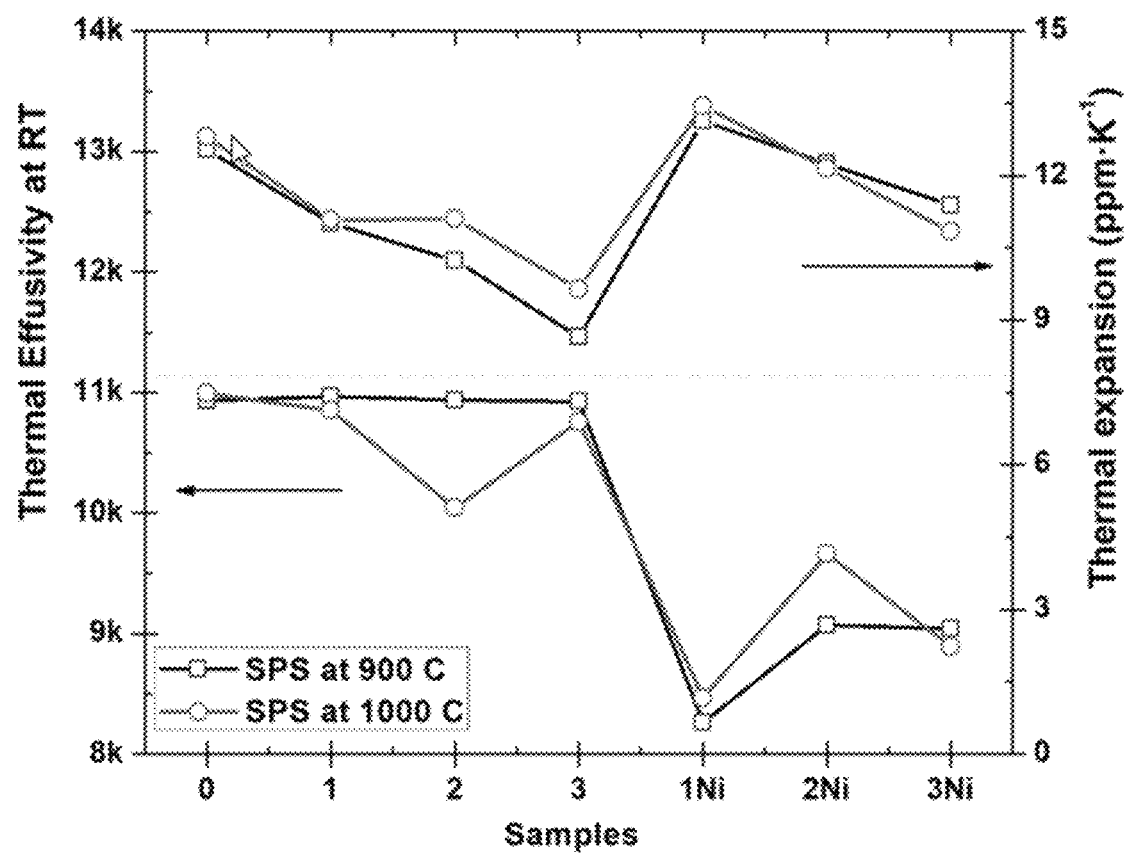
FIG. 7 shows plots of the thermal effusivity and expansion of samples SPS sintered at 900° C. and 1000° C. vs sample composition.

The thermal effusivity and coefficient of expansion are shown in FIG. 7, which agree well with the trend observed in the thermal conductivity especially for Ni coated cBN reinforced samples. A reduction in the thermal conductivity influences the surface effusivity as less heat will be emitted from a low heat conducting material. However, the thermal coefficient of expansion exhibited a decreasing trend of up to 30 wt. % cBN reinforcement because of the low thermal expansion properties of the cBN reinforcement [Paszkowicz et al. "Thermal expansion of polycrystalline cBN in low temperature range" Synchrotron Radiat Nat Sci (2012) 11:140502, incorporated herein by reference in its entirety]. Sudden increase in the expansion coefficient is observed with the addition of 10 wt. % Ni coated cBN reinforcement (see FIG. 7). Further addition of Ni-coated cBN resulted in a gradual reduction in coefficient of expansion, which may be caused by the aforementioned transformation and the subsequent reduction in Ni content due to melting out or draining of material.

Figure 8:
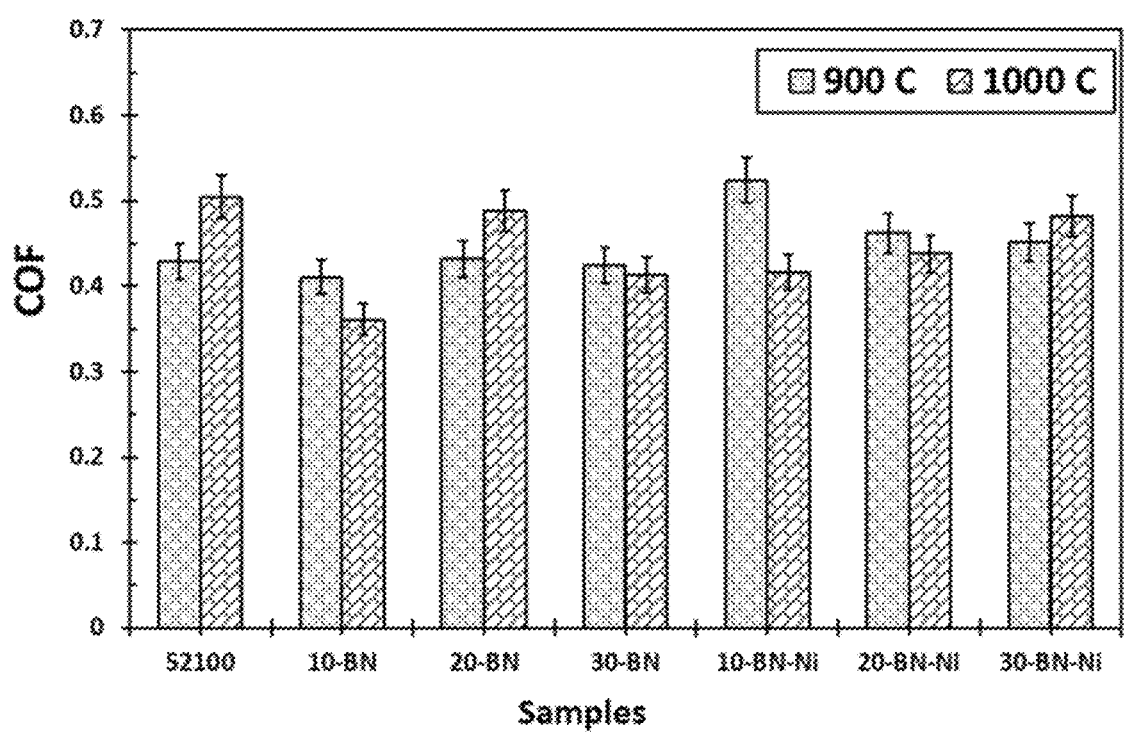
FIG. 8 shows the coefficient of friction of the prepared samples.
Figure 9:
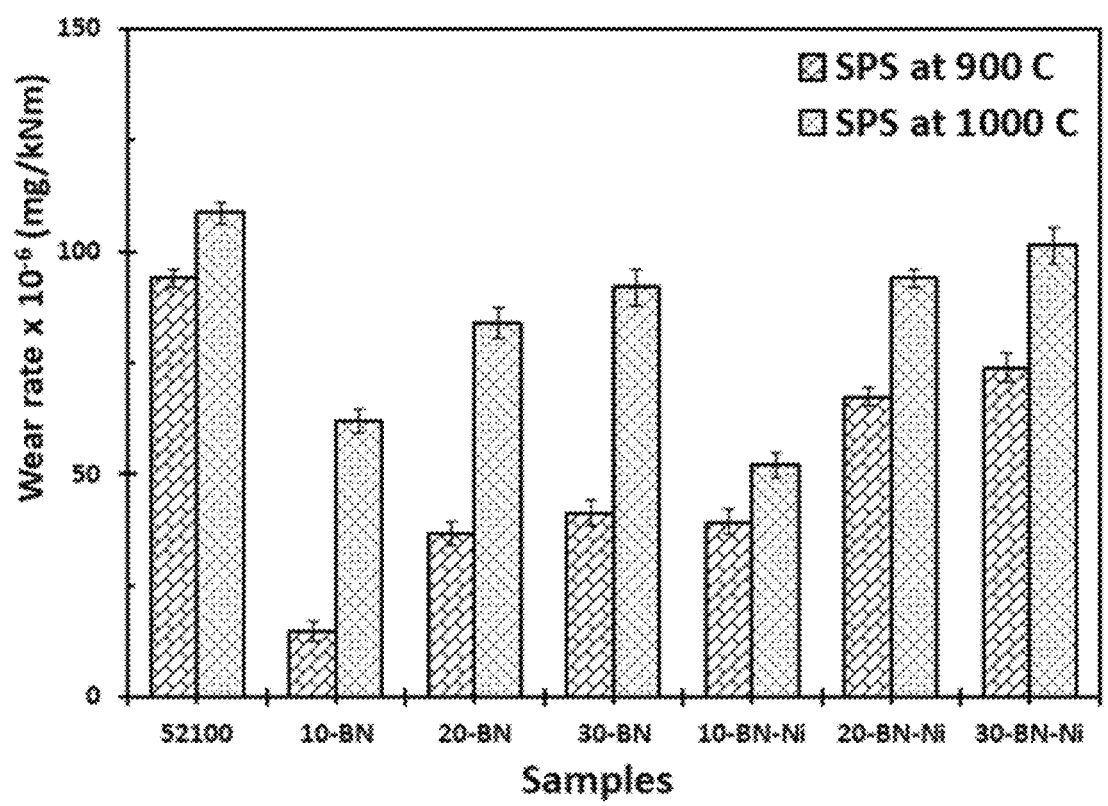
FIG. 9 shows specific wear rate of the prepared samples.
Figure 10:
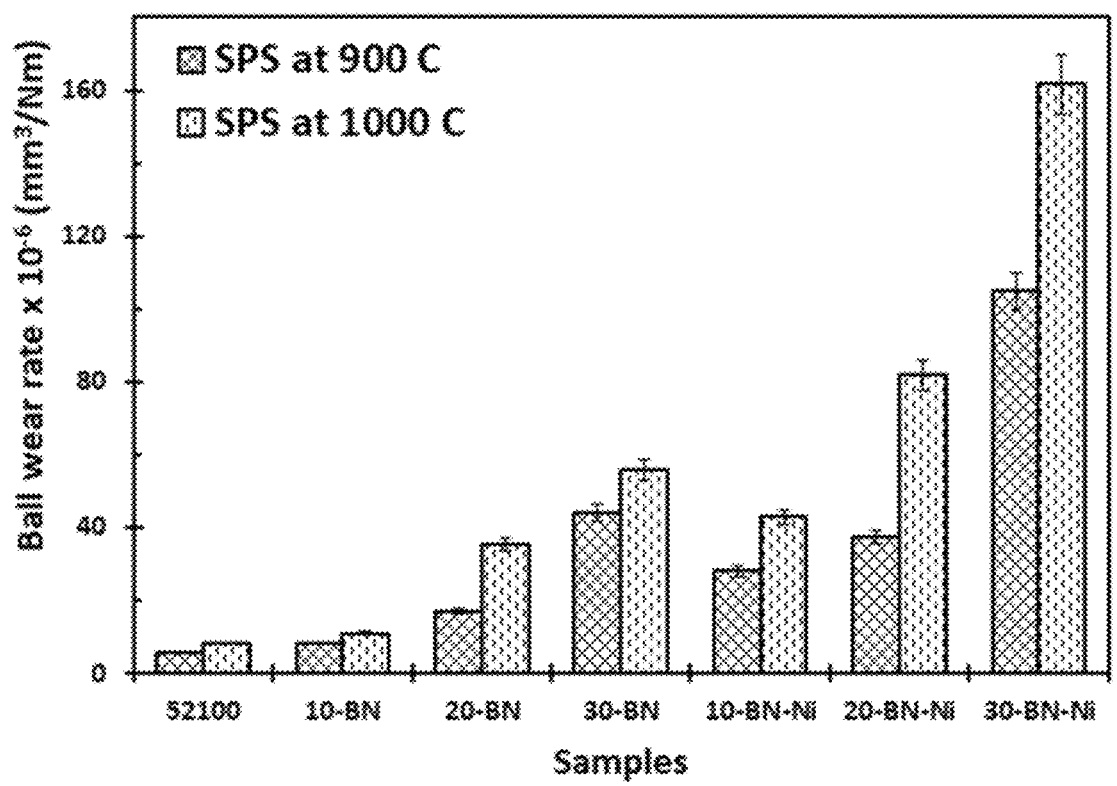
FIG. 10 shows the specific wear rate of the counter face tungsten carbide ball of the prepared samples.

The wear resistance and friction properties were evaluated using a ball-on-disc sliding test configuration. The counterface is a tungsten carbide (WC) ball with 6.3 mm diameter and the sliding radius was 3 mm. A normal load of 50 N was applied for a sliding duration of 50 min with rotating sliding speed of 318 rpm. The specific wear rate was obtained by measuring the net weight using a high-resolution analytical weight balance (AUW220D, Shimadzu Analytical Balance, Japan). The resolution and repeatability of the weight balance are 0.01 mg and <0.1 mg, respectively. The specific wear rate is expressed as mass loss per unit sliding distance per applied load (mg/kNm) accordingly. FIG. 8 shows the coefficient of friction (COF) of the samples for 300 m sliding distance. It can be said that the COF falls within a close range of 0.35 to 0.55 and that the presence of the cBN reinforcement does not have a significant effect on the COF of the bearing steel. These values are well comparable with obtained COF for the sliding between bearing steel and WC [Mitterer, C. "Comprehensive Hard Materials" Elsevier (2014), doi:10.1016/B978-0-08-096527-7.00035-0, incorporated herein by reference in its entirety]. Rather, the COF was comparable with the COF of the bearing steel when sliding against WC. Venkateswaran et al. ["Tribological properties of WC-ZrO2 nanocomposites" J Am Ceram Soc (2005) 88:691-7, doi:10.1111/j.1551-2916.2005.00129.x, incorporated herein by reference in its entirety] had shown that the COF of bearing steel sliding against WC increases with increasing the normal applied load. They reported that the COF increased from 0.15 to 0.5 when the applied normal load changed from 2 to 10 N. That can be due to the high contact pressure and the brittle nature of the ceramics. As the cBN reinforcement increased to 30 wt. %, the sliding becomes mainly between WC and cBN resulting in a relatively high COF. That is typical, when hard-metals slid against each other. The wear rate trend of the samples is depicted in FIG. 9. It is observed that the cBN and Ni coated cBN reinforced composite samples offered better resistance than the reinforced SPS sintered samples. That is in general ascribed to the improved mechanical properties sequel to hard second phase strengthening mechanism. In comparing the sintering temperatures, SPS samples sintered 900° C. shows a lower wear rate as compared to the same composition sintered at 1000° C. for all composition considered. Also, the wear rate of the counter face ball is shown in FIG. 10. It is clear that the wear rate of the counter face ball increased proportionally with the increment of the reinforcement of the bearing steel composite. This is inconsonant with the increasing mechanical properties. It should be noted that the WC ball demonstrated significantly higher wear rate when rubbed against the Ni-coated cBN reinforced steel composites sintered at 900 and 1000° C.

The invention claimed is:

1. A method of making a bearing steel, comprising:
sonicating a suspension of 52100-chrome steel powder and cubic boron nitride powder in ethanol to form a sonicated suspension,
removing the ethanol from the sonicated suspension to produce a dry homogeneous mixture of the 52100-chrome steel powder and cubic boron nitride powder,
placing the dry homogeneous mixture in a sintering graphite die; and
consolidating the dry homogeneous mixture by spark plasma sintering at a temperature in the range of 900° C. to 1000° C. and a pressure in the range of 45-55 MPa for a time in the range 8-12 minutes to obtain the beating steel;
wherein
the cubic boron nitride powder comprises microparticles having a diameter of from 5 to 100 µm,
a content of the cubic boron nitride is from 10 wt % to 30 wt % of the bearing steel,
a particle size range of the 52100-chrome steel powder is from 10 to 100 µm, and
a particle size distribution of the 52100-chrome steel powder has 95% less than 47.53 µm,
particles of the cubic boron nitride are uniformly distributed in a matrix of the bearing steel, a density of the bearing steel is from 5.31 g/cm² to 6.83 g/cm², and a hardness of the bearing steel is from 50 HRC to 53 HRC.

2. The method of claim 1 wherein a heating rate to the spark plasma sintering temperature is 400° C./min and a cooling rate following the spark plasma sintering is 200° C./min.

3. The method of claim 1, wherein the sintering graphite die is lined with a graphite sheet and covered with a graphite blanket.

4. The method of claim 3, further comprising grinding the obtained bearing steel with SiC paper to remove the graphite sheet.

5. A method of making a bearing steel, comprising:

sonicating a suspension of a 52100-chrome steel powder and a nickel coated boron nitride powder in ethanol to form a sonicated suspension, removing the ethanol from the sonicated suspension to produce a dry homogeneous powder mixture of the 52100-chrome steel powder and the nickel coated boron nitride powder, placing the thy homogeneous mixture in a sintering graphite die; and consolidating the dry homogeneous powder mixture by spark plasma sintering at a temperature in the range of 900° C. to 1000° C. and a pressure in the range of 45-55 MPa for a time in the range 8-12 minutes to obtain the bearing steel;

wherein the nickel coated cubic boron nitride powder comprises microparticles having a diameter of from 5 to 100 μm, the nickel of the nickel coated cubic boron nitride powder is in the form of nanoparticles having a diameter from 20 to 500 nm, a particle size distribution of the 52100-chrome steel powder is from 10 to 100 urn, and a particle size distribution of the 52100-chrome steel powder has 95% less than 47.53 μm, a content of the nickel coated boron nitride is from 10 wt,% to 20 wt. % of the total weight of the bearing steel, a density of the bearing steel is from 6.27 g/cm² to 6.93 g/cm², a hardness of the bearing steel is from 45 HRC to 48 HRC, and an XRD spectrum of the beating, steel does not contain a peak at 2θ of 44.56°.

6. The method of claim 5 wherein a heating rate to the spark plasma sintering temperature is 400° C./min and a cooling rate following the spark plasma sintering is 200° C./min.

7. The method of claim 5, wherein the bearing steel obtained is non-magnetic.

8. The method of claim 5 wherein the sintering graphite die is lined with a graphite sheet and covered with a graphite blanket.

9. The method of claim 8, further comprising grinding the obtained bearing steel with SiC paper to remove the graphite sheet.

* * * * *